US006317599B1

(12) United States Patent
Rappaport et al.

(10) Patent No.: US 6,317,599 B1
(45) Date of Patent: Nov. 13, 2001

(54) METHOD AND SYSTEM FOR AUTOMATED OPTIMIZATION OF ANTENNA POSITIONING IN 3-D

(75) Inventors: Theodore S. Rappaport; Roger R. Skidmore, both of Blacksburg, VA (US)

(73) Assignee: Wireless Valley Communications, Inc., Blacksburg, VA (US)

(*) Notice: Subject to any disclaimer, the term of this patent is extended or adjusted under 35 U.S.C. 154(b) by 0 days.

(21) Appl. No.: 09/318,840

(22) Filed: May 26, 1999

(51) Int. Cl.⁷ .................... H04Q 7/20; H04B 17/00
(52) U.S. Cl. ................ 455/446; 455/67.1; 455/424; 703/2; 703/22; 703/21; 703/3
(58) Field of Search ...................... 455/446, 67.1, 455/67.6, 424, 423, 67.3, 524, 525, 449, 422; 703/2, 3, 4, 21, 22; 716/10; 709/220, 226

(56) References Cited

U.S. PATENT DOCUMENTS

| | | | |
|---|---|---|---|
| 5,491,644 | * | 2/1996 | Pickering et al. ............ 455/67.6 X |
| 5,561,841 | * | 10/1996 | Markus ........................ 455/446 |
| 5,598,532 | * | 1/1997 | Liron ............................ 703/2 |
| 5,794,128 | * | 8/1998 | Brockel et al. ................ 455/67.1 |
| 5,949,988 | * | 9/1999 | Feisullin et al. .............. 703/2 |
| 5,953,669 | * | 9/1999 | Stratis et al. ............... 455/446 X |
| 5,987,328 | * | 11/1999 | Ephremides et al. .......... 455/446 |

OTHER PUBLICATIONS

Bell Laboratories, "Wise—A Wireless System Engineering Tool", pub. date unknown, web pages from bell–labs.com.
Mobile Systems International, "Planet", pub. date unknown, web pages from .msi–swe.se.
EDX Engineering, Inc., "EDX Engineering—Products: Version 2.0 of EDX SignalPro(tm)", pub. date unknown, web pages from .edx.com.

Ericsson Wireless Communications, "TEMS Total—Total—TEMS Product Overview", pub. date unknown, web pages from. ericsson.com.
Ericsson Wireless Communications, "TEMS Total—TEMS Frequently asked questions—general", pub. date unknown, web pages from. ericsson.com.
Ericsson Wireless Communications, "TEMS Total—TEMS Light Frequently asked questions—general", pub. date unknown, web pages from .ericsson.com.
Ericsson Wireless Communications, "TEMS Total—TEMS Makes Your Net Work", pub. date unknown, web pages from .ericsson.com.
D. Ullmo et al., "Wireless Propagation in Buildings: A Statistic Scattering Approach", IEEE Transactions on Vehicular Technology, vol. 48, No. 3, May 1999.
S. Seidel et al., "Site–Specific Propagation Prediction for Wireless In–Building Personal Communications System Design", IEEE Transactions on Vehicular Technology, vol. 43, No. 4, Nov. 1994.

(List continued on next page.)

Primary Examiner—Tracy LeGree
(74) Attorney, Agent, or Firm—McGuireWoods LLP

(57) ABSTRACT

A method for engineering management and planning for the design of a wireless communications network in three-dimensions (3-D) combines computerized organization, database fusion, and radio frequency (RF) site-specific planning models. The method enables a designer to keep track of wireless system performance throughout the process of pre-bid design, installation and maintenance of a wireless system. Using a database of information that defines the desired environment, predictions of antenna coverage, system coverage and interference, and other wireless system performance criteria, such as frame error rate and network throughput, can be made. Watch points are created to ensure, in real time, that any modifications to the design of the wireless system do not degrade the performance of the system with respect to the watch point locations.

9 Claims, 16 Drawing Sheets

OTHER PUBLICATIONS

M. Panjwani et al., "Interactive Computation of Coverage Regions for Wireless Communication in Multifloored Indoor Environments", IEEE Journal on Selected Areas in Communications, vol. 14, No. 3, Apr. 1996.

C. M. Peter Ho, et al., "Antenna Effects on Indoor Obstructed Wireless Channels and a Deterministic Image-Based Wide–Based Propagation Model for In–Building Personal Communications Systems", International Journal of Wireless Information Networks, vol. 1, No. 1, 1994.

S. Kim et al., "Radio Propagation Measurements and Prediction Using Three–Dimensional Ray Tracing in Urban Environments at 908 MHz and 1.9 GHz", IEEE Transactions on Vehicular Technology, vol. 48, No. 3, May 1999.

L. Piazzi et al., "Achievable Accuracy of Site–Specific Path–Loss Predictions in Residential Environments", IEEE Transactions on Vehicular Technology, vol. 48, No. 3, May 1999.

S. Sandip et al., "Predicted Path Loss Rosslyn, VA", The Bradley Department of Electrical Engineering, MPRG TR–95–03, Virginia Tech, Mar. 5, 1995.

S. Sandip et al., "Predicted Path Loss for Rosslyn, VA", The Bradley Department of Electrical Engineering, First Set of Predictions, MPRG TR–94–20, Virginia Tech, Dec. 9, 1994.

G. Durgin, et al., "Measurements and Models for Radio Path Loss and Penetration Loss in and Around Homes and Trees at 5.85 GHz", IEEE Transactions on Communications, vol. 46, No. 11, Nov. 1998.

R. Skidmore et al., "A Comprehensive In–Building and Microcellular Wireless Communications System Design Tool", The Bradley Department of Electrical Engineering, MPRG–TR–97–13, Jun. 9, 1997.

T. Rappaport, et al., "Radio Propagation Prediction Techniques and Computer–Aided Channel Modeling for Embedded Wireless Microsystems", The Bradley Department of Electrical Engineering, ARPA, Annual Report, Jul. 1994.

T. Rappaport, et al., "Radio Propagation Prediction Techniques and Computer–Aided Channel Modeling for Embedded Wireless Microsystems", The Bradley Department of Electrical Engineering, ARPA, Semi–Annual Report, Jul. 1995.

T. Rappaport et al., "Use of Topographic Maps With Building Information to Determine Antenna Placements and GPS Satellite Coverage for radio Detection and Tracking in Urban Environments", The Bradley Department of Electrical Engineering, Quarterly Report, Sep. 1995.

T. Rappaport et al., "Use of Topographic Maps With Building Information to Determine Antenna Placements and GPS Satellite Coverage for radio Detection and Tracking in Urban Environments", The Bradley Department of Electrical Engineering, MPRG–TR–95–19, Nov. 1995.

R. Skidmore et al., "Interactive Coverage Region and System Design Simulation for Wireless Communication Systems in Multi–floored Indoor Environments, SMT Plus" IEEE ICUPC '96 Proceedings.

"Site Planner 3.16 for Windows 95/98/NT User's Manual" (Wireless Valley Communications, Inc. 1999), pp. 5–148 to 5–156.

* cited by examiner

METHOD AND SYSTEM FOR AUTOMATED OPTIMIZATION OF ANTENNA POSITIONING IN 3-D

CROSS-REFERENCE TO RELATED APPLICATIONS

This application is related to concurrently filed applications Ser. No. 09/318,842, entitled "Method and System for Managing a Real Time Bill of Materials," filed by T. S. Rappaport and R. R. Skidmore (Docket 256016AA) and Ser. No. 09/318,841, entitled "Method And System For a Building Database Manipulator," filed by T. S. Rappaport and R. R. Skidmore and copending application Ser. No. 09/221,985, entitled "System for Creating a Computer Model and Measurement Database of a Wireless Communication Network" filed by T. S. Rappaport and R. R. Skidmore and assigned to a common assignee, the subject matter of which is incorporated herein by reference.

DESCRIPTION

BACKGROUND OF THE INVENTION

1. Field of the Invention

The present invention generally relates to engineering and management systems for the design of wireless communications networks and, more particularly, to a method for optimizing the types of and locations for antennas in wireless communication systems in any environment in the world (e.g. buildings, campuses, floors within a building, within cities, or in an outdoor setting, etc.) using a three-dimensional (3-D) representation of the environment and utilizing selected areas within the environment referenced herein as "watch points" to ensure critical wireless communication system performance is maintained.

2. Background Description

As wireless communications use increases, radio frequency (RF) coverage within buildings and signal penetration into buildings from outside transmitting sources has quickly become an important design issue for wireless engineers who must design and deploy cellular telephone systems, paging systems, or new wireless systems and technologies such as personal communication networks or wireless local area networks. Designers are frequently requested to determine if a radio transceiver location, or base station cell site can provide reliable service throughout an entire city, an office, building, arena or campus. A common problem for wireless systems is inadequate coverage, or a "dead zone," in a specific location, such as a conference room. It is now understood that an indoor wireless PBX (private branch exchange) system or wireless local area network (WLAN) can be rendered useless by interference from nearby, similar systems. The costs of in-building and microcell devices which provide wireless coverage within a 2 kilometer radius are diminishing, and the workload for RF engineers and technicians to install these on-premises systems is increasing sharply. Rapid engineering design and deployment methods for microcell and in-building wireless systems are vital for cost-efficient build-out.

Analyzing radio signal coverage penetration and interference is of critical importance for a number of reasons. A design engineer must determine if an existing outdoor large scale wireless system, or macrocell, will provide sufficient coverage throughout a building, or group of buildings (i.e., a campus). Alternatively, wireless engineers must determine whether local area coverage will be adequately supplemented by other existing macrocells, or whether indoor wireless transceivers, or picocells, must be added. The placement of these cells is critical from both a cost and performance standpoint. If an indoor wireless system is being planned that interferes with signals from an outdoor macrocell, the design engineer must predict how much interference can be expected and where it will manifest itself within the building, or group of buildings. Also, providing a wireless system that minimizes equipment infrastructure cost as well as installation cost is of significant economic importance. As in-building and microcell wireless systems proliferate, these issues must be resolved quickly, easily, and inexpensively, in a systematic and repeatable manner.

There are many computer aided design (CAD) products on the market that can be used to design the environment used in one's place of business or campus. WiSE from Lucent Technology, Inc., SignalPro from EDX, PLAnet by Mobile Systems International, Inc., and TEMS and TEMS Light from Ericsson are examples of wireless CAD products. In practice, however, a pre-existing building or campus is designed only on paper and a database of parameters defining the environment does not readily exist. It has been difficult, if not generally impossible, to gather this disparate information and manipulate the data for the purposes of planning and implementation of indoor and outdoor RF wireless communication systems, and each new environment requires tedious manual data formatting in order to run with computer generated wireless prediction models. Recent research efforts by AT&T Laboratories, Brooklyn Polytechnic, and Virginia Tech, are described in papers and technical reports entitled "Radio Propagation Measurements and Prediction Using Three-dimensional Ray Tracing in Urban Environments at 908 MHZ and 1.9 GHz," (*IEEE Transactions on Vehicular Technology*, VOL. 48, No. 3, May 1999), by S. Kim, B. J. Guarino, Jr., T. M. Willis III, V. Erceg, S. J. Fortune, R. A. Valenzuela, L. W. Thomas, J. Ling, and J. D. Moore, (hereinafter "Radio Propagation"); "Achievable Accuracy of Site-Specific Path-Loss Predictions in Residential Environments," (*IEEE Transactions on Vehicular Technology*, VOL. 48, No. 3, May 1999), by L. Piazzi and H. L. Bertoni; "Measurements and Models for Radio Path Loss and Penetration Loss In and Around Homes and Trees at 5.85 Ghz," (*IEEE Transactions on Communications*, Vol. 46, No. 11, November 1998), by G. Durgin, T. S. Rappaport, and H. Xu; "Radio Propagation Prediction Techniques and Computer-Aided Channel Modeling for Embedded Wireless Microsystems," ARPA Annual Report, MPRG Technical Report MPRG-TR-94-12, July 1994, 14 pp., Virginia Tech, Blacksburg, by T. S. Rappaport, M. P. Koushik, J. C. Liberti, C. Pendyala, and T. P. Subramanian; "Radio Propagation Prediction Techniques and Computer-Aided Channel Modeling for Embedded Wireless Microsystems," MPRG Technical Report MPRG-TR-95-08, July 1995, 13 pp., Virginia Tech, Blacksburg, by T. S. Rappaport, M. P. Koushik, C. Carter, and M. Ahimed; "Use of Topographic Maps with Building Information to Determine Antenna Placements and GPS Satellite Coverage for Radio Detection & Tracking in Urban Environments," MPRG Technical Report MPRG-TR-95-14, Sep. 15, 1995, 27 pp., Virginia Tech, Blacksburg, by T. S. Rappaport, M. P. Koushik, M. Ahmed, C. Carter, B. Newhall, and N. Zhang; "Use of Topographic Maps with Building Information to Determine Antenna Placement for Radio Detection and Tracking in Urban Environments," MPRG Technical Report MPRG-TR-95-19, November 1995, 184 pp., Virginia Tech, Blacksburg, by M. Ahmed, K. Blankenship, C. Carter, P. Koushik, W. Newhall, R. Skidmore, N. Zhang and T. S. Rappaport; "A Comprehensive In-Building and Microcellular Wireless Communications System Design Tool," MPRG-TR-97-13, June 1997, 122 pp., Virginia Tech, Blacksburg, by R. R. Skidmore and T. S. Rappaport; "Predicted Path Loss for Rosslyn, VA," MPRG-TR-94-20, Dec. 9, 1994, 19 pp., Virginia Tech, Blacksburg, by S. Sandhu, P. Koushik, and T. S. Rappaport; "Predicted Path Loss for Rosslyn, Va., Second set of predictions for ORD Project on Site Specific Propagation Prediction" MPRG-TR-95-03, Mar. 5, 1995, 51 pp., Virginia Tech, Blacksburg, by S. Sandhu, P. Koushik, and T. S. Rappaport. These papers and technical reports are illustrative of the state of the art in site-specific propagation modeling and show the difficulty in obtaining databases for city environments, such as Rosslyn, Va. While the above papers describe a research comparison of measured vs. predicted signal coverage, the works do not demonstrate a systematic, repeatable and fast methodology for creating an environmental database, nor do they report a method for visualizing and placing various environmental objects that are required to model the propagation of RF signals in the deployment of a wireless system in that environment.

While there are methods available for designing wireless networks that provide adequate system performance, these known methods involve costly and time consuming predictions of wireless system performance that, while beneficial to a designer, require too much time to be applied in a real time manner.

SUMMARY OF THE INVENTION

It is an object of the invention to provide a method for automated system performance prediction and optimization of antenna and wireless system component selection, positioning and reorientation in three-dimensions.

It is another object of the invention to provide a method of selecting a number of fixed or movable points of specific interest, or "watch points", in an environment such that the predictive wireless system values at the watch points are dynamically updated as the watch points or antennas are repositioned or reoriented or the wireless system is altered with substitute components or with alternate designs or physical layouts.

According to the present invention, a system is provided for allowing an RF system designer to dynamically model a wireless communication system for a building, campus, city or other environment electronically. The method includes the selection and placement of various commercial hardware components, such as antennas (point, omni-directional, leaky feeders, etc.), transceivers, amplifiers, cables and the like, and allows the user to observe the effects of their placement and movement at other locations or watch points chosen by the designer. Thus, the placement of components can be refined and fine tuned prior to actual implementation of a system to ensure that all required areas of the facility are blanketed with adequate RF coverage or system performance and that there are no areas with insufficient RF coverage, known as "dead zones," or poor network delay, known as "outages."

The present method for rapidly determining the ideal type, location and/or orientation of the antenna components in a wireless communication system offer significant value for wireless system designers and provides a marked improvement over present day techniques.

The invention further allows the user to differentiate between the forward channel (the communication path from a fixed antenna or groups of antennas to a watch point) and the reverse channel (the communication path from one or more watch points to a fixed antenna or groups of antennas).

To accomplish the above, a 3-D model of the environment is stored as a CAD model in an electronic database. The physical, electrical, and aesthetic parameters attributed to the various parts of the environment such as walls, floors, ceilings, trees, hills, foliage, buildings, and other obstacles which effect RF waves are also stored in the database. A representation of the 3-D environment is displayed on a computer screen for the designer to view. The designer may look at the entire environment in simulated 3-D or zoom in on a particular building, floor, or other area of interest. With the mouse or other input positioning device the designer may select and view various commercial communication hardware devices from a series of pull-down menus. The performance, cost and other technical specifications for these hardware devices are stored in the computer. Again using the mouse, the designer points and clicks thereby positioning selected hardware devices throughout the displayed environment. For example, the designer may place several transceiver base stations from a particular manufacturer in various rooms in the displayed building and thereafter may connect various antenna selections to the transceivers. The designer may also select from a menu one or more of a variety of amplifiers, cables and other components, to connect and build various parts of the system. Again using the mouse, watch points may be selected and placed throughout the displayed building. Thereafter, a wireless system performance prediction model is run whereby the computer displays on the screen at each of the various watch points the RF values, for instance, received signal strength intensity (RSSI), network throughput, bit error rate, frame error rate, signal to interference ratio (SIR), and signal to noise ratio (SNR), provided by the communication system just designed. The wireless system performance model may be computed and results displayed in real time or may be selectable by the user. Further, the designer can use the positioning device to drag or otherwise move various pieces of hardware around the displayed building or even replace a hardware device and the invention will dynamically update the wireless system performance values displayed at the watch points. The orientation of an antenna can also be modified at any time and models may be run automatically or stepped manually by the user to gauge system performance changes. The watch points themselves may be repositioned by a mouse or other input device, providing the user with a means of predicting wireless system performance "on-the-fly", in real time.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Using the present method, it is now possible to assess the RF environment in a systematic, organized fashion by quickly viewing signal strength, or interference levels, or other wireless system performance measures. The current embodiment is designed specifically for use with the SitePlanner™ suite of products available from Wireless Valley Communications, Inc. of Blacksburg, Va. However, it will be apparent to one skilled in the art that the method could be practiced with other products either now known or to be invented. (SitePlanner is a trademark of Wireless Valley Communications, Inc.)

Figure 1:
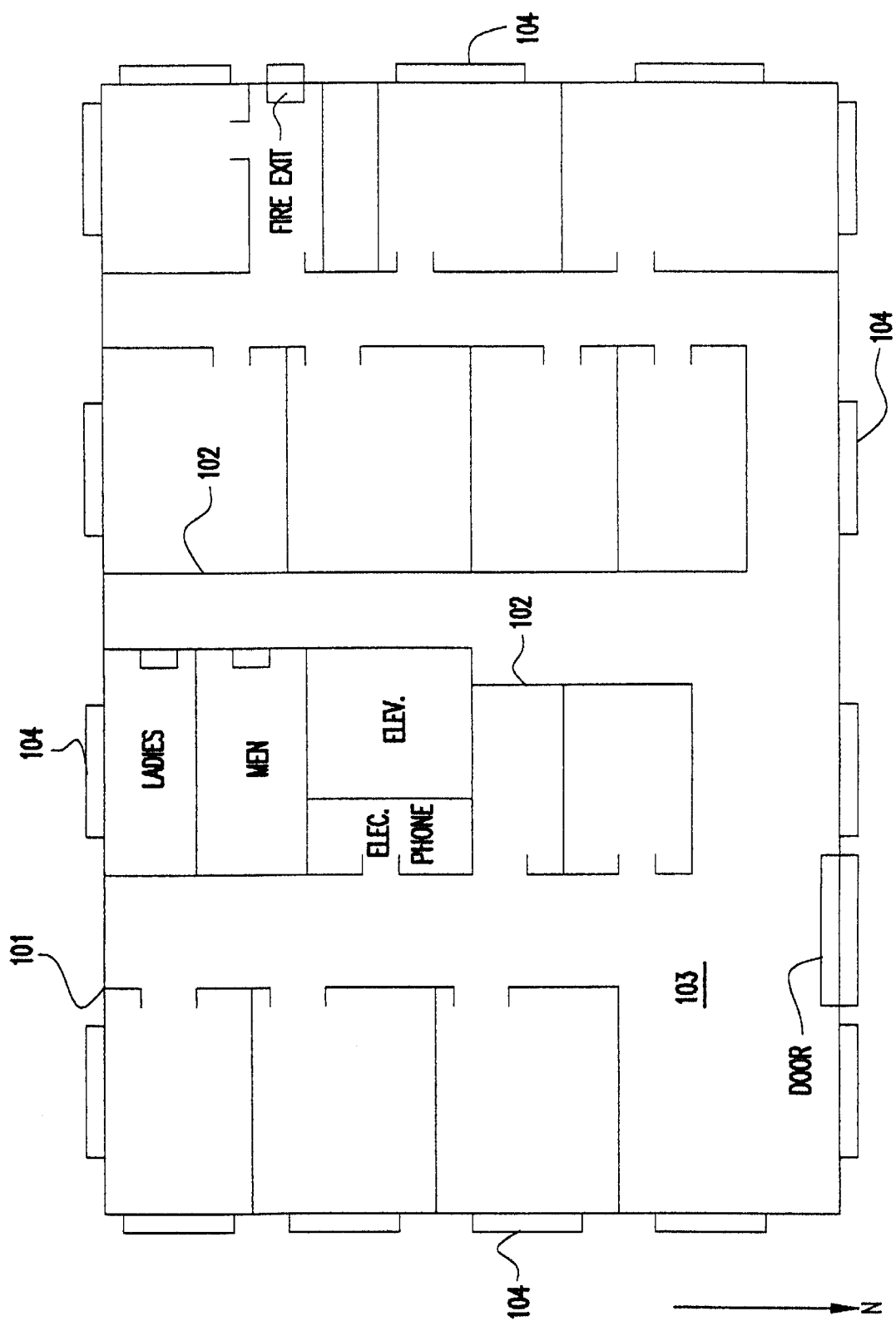
FIG. 1 shows an example of a simplified layout of a floor plan of a building.

Referring now to FIG. 1, there is shown a two-dimensional (2-D) simplified example of a layout of a building floor plan. The method uses 3-D computer aided design (CAD) renditions of a building, or a collection of buildings and/or surrounding terrain and foliage. However, for simplicity of illustration a 2-D figure is used. The various physical objects within the environment such as external walls 101, internal walls 102 and floors 103 are assigned appropriate physical, electrical, and aesthetic values. For example, outside walls 101 may be given a 10 dB attenuation loss, signals passing through interior walls 102 may be assigned 3 dB attenuation loss, and windows 104 may show a 2 dB RF penetration loss. In addition to attenuation, the obstructions 101, 102 and 103 are assigned other properties including reflectivity and surface roughness.

Estimated partition electrical properties loss values can be extracted from extensive propogation measurements already published, which are deduced from field experience, or the partition losses of a particular object can be measured directly and optimized instantly using the present invention combined with those methods described in the copending application Ser. No. 09/221,985, entitled "System for Creating a Computer Model and Measurement Database of a Wireless Communication Network" filed by T. S. Rappaport and R. R. Skidmore. Once the appropriate physical and electrical parameters are specified, any desired number of hardware components of RF sources can be placed in the 3-D building database, and received signal strengths (RSSI), network throughput, bit or frame error rate, or carrier-to-interference (C/I) ratios can be plotted directly onto the CAD drawing. The 3-D environment database could be built by a number of methods, the preferred method being disclosed in the concurrently filed, copending application Ser. No. 09/318,842. Traffic capacity analysis, frequency planning, co-channel interference analysis can be performed in the invention along with RF coverage prediction. Other system performance metrics may be easily incorporated by one skilled in the art through well known equations.

Figure 2:
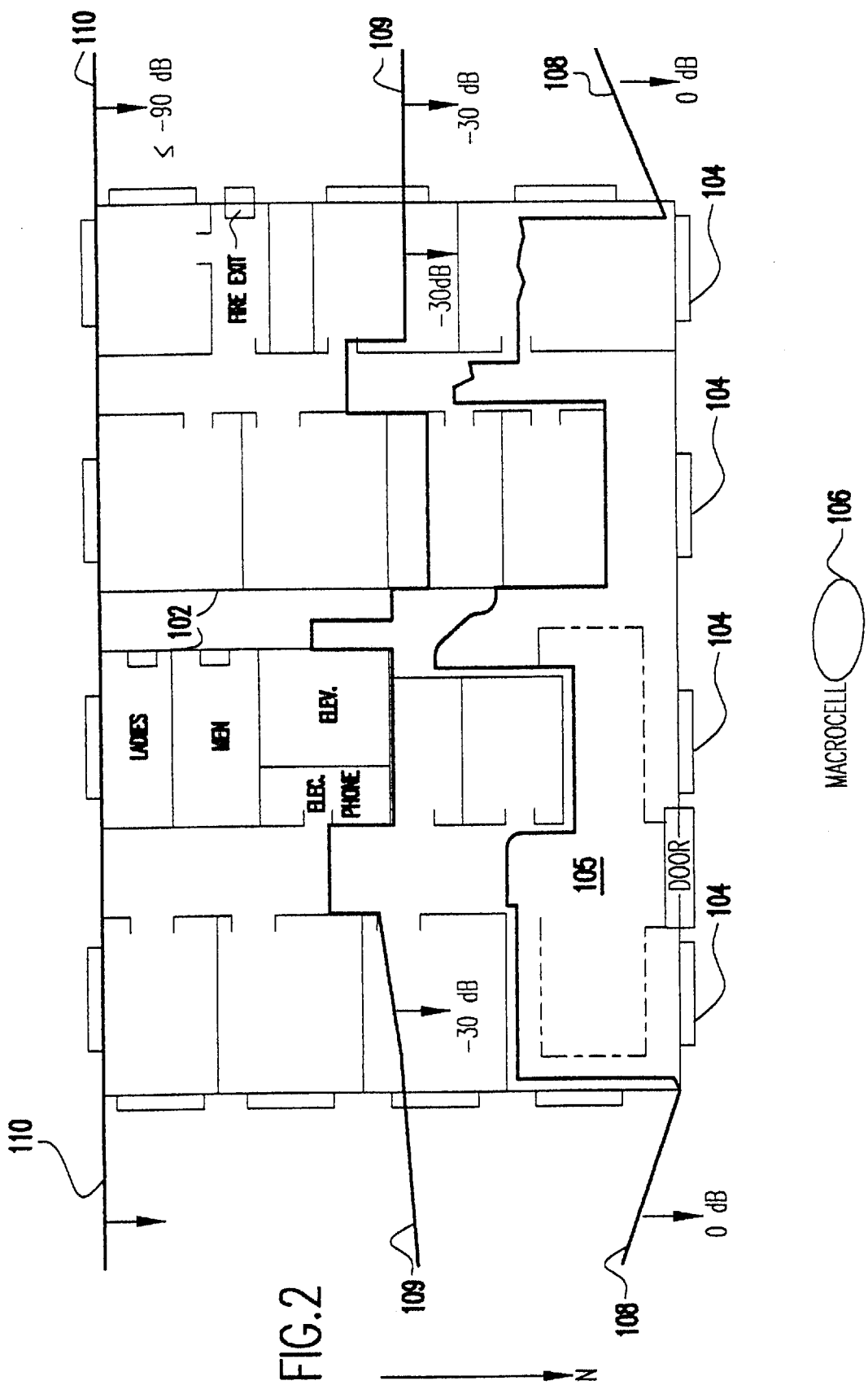
FIG. 2 shows effective penetration of Radio Frequency (RF) transmission into a building from a macrocell.

FIG. 2 depicts effective RF penetration into a building from the distant macrocell using a close-in virtual macrocell transmitting into the lossless distributed antenna.

Referring to FIG. 2, there are several windows 104, and even a large glass foyer 105, on the north wall of the building, so RF penetration into this part of the building is quite good, as shown by contour lines 108 and 109 for 0 dB and −30 dB, respectively. Even so, interior walls 102 cause signal levels in some areas to drop below a minimum useable signal strength of about −90 dBm, especially in some of the southern rooms, as shown by contour line 110. Consequently, macrocell coverage there will probably be poor.

Other outdoor macrocells can be modeled in the same way, and their signal strength contours plotted, to determine if hand-offs can compensate for the inadequacies of the macrocell north of the building. If not, then indoor picocells (and their distributed feed systems, antennas, and antenna patterns) can be easily added if necessary, and their performance checked using the method, to complement coverage provided by the macrocells.

The mathematical propagation models used to predict and optimize antenna positioning in a desired environment may include a number of predictive techniques models, such as those described in the previously cited and following technical reports and papers: "Interactive Coverage Region and System Design Simulation for Wireless Communication Systems in Multi-floored Indoor Environments, SMT Plus," *IEEE ICUPC '96 Proceedings,* by R. R. Skidmore, T. S. Rappaport, and L. Abbott which is hereby incorporated by reference. Some simple models are also briefly described in "SitePlanner 3.16 for Windows 95/98/NT User's Manual" (Wireless Valley Communications, Inc. 1999), hereby incorporated by reference. It would be apparent to one skilled in the art how to apply other system performance models to this method.

Interference, instead of radio signal strength, is the dominant performance-limiting factor in many situations due to increased wireless communications use. Modeling interference from any source to an established or contemplated wireless system is straightforward using the method. Suppose, for example, that an indoor wireless communication system is assigned a frequency set identical to that of an outdoor wireless system. Although the indoor system may provide sufficient RSSI throughout its coverage area, interference from the outside system may still render the indoor wireless system ineffectual in certain parts of the building.

Caution must be used, however, when modeling and analyzing interference, since the detrimental effect may also depend upon technologies and/or signal processing technologies, not just signal power levels. For example, a geographic area could have similar narrowband and/or wideband in the 800 MHZ cellular bands, for instance with Advanced Mobile Phone System (AMPS) and Code Division Multiple Access (CDMA) systems, but users using either technology may be able to coexist if their respective demodulation processes reject interference provided by the undesired system. The current embodiment of this invention allows the user to select the air interface/technology being used by the wireless system being designed and automatically adjusts the prediction of interference accordingly.

Figure 3:
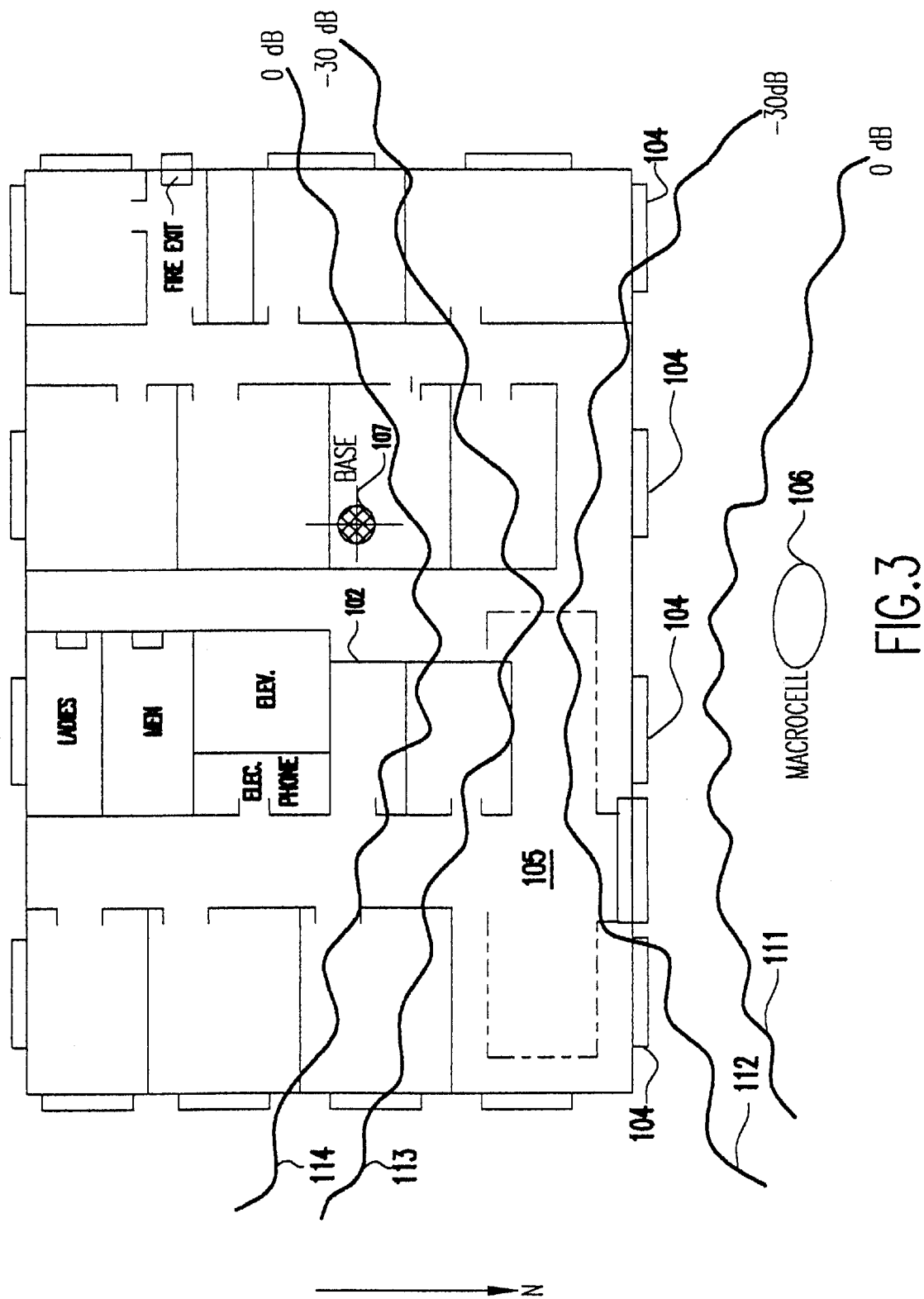
FIG. 3 shows a simplified layout of a floor plan of a building including an outdoor macrocell and an indoor base station.

FIG. 3 shows another rendition of the office building example, but an indoor wireless system 107 has been added. In this example, 800 MHZ AMPS technology is assigned to both transmitters 106 and 107. Differing wireless standards and technologies such as CDMA and Global System Mobile (GSM) could have been selected as well. The present invention uses a database to represent the exact physical air interface standards of a wide range of technologies and may be easily edited for future air interface standards. As new technologies are developed, one skilled in the art could easily modify this invention to include the new technologies.

The outdoor wireless system 106 is now interfering with the indoor network, and the effect is checked by plotting C/I contours 111 and 112 at 0 dB and −30 dB, respectively, for the outdoor system and also plotting C/I contours 113 and 114 at 0 dB and −30 dB for the indoor system. The 0 dB contour 114 shows where the desired and interfering signal levels are equal, so the interfering outdoor system's signal predominates in areas outside this contour. It is obvious that the indoor network is rendered useless throughout many parts of the building. There are a number of possible solutions that may be analyzed by a designer using the present invention.

One solution is to change the indoor system's antenna location or increase the transmitted power, add more nodes, or select a different frequency set. These changes may be made with the simple click of a mouse in the method of the invention, so that new channel sets, antenna locations, or alternative antenna systems (such as in-building distributed systems, directional antennas, or leaky feeders) may be evaluated quickly, thereby eliminating guesswork and/or costly on-site experimentation with actual hardware. Instead of displaying contours of coverage or interference, the present invention also allows the user to specify fixed or moveable watch points that indicate or display predicted performance in extremely rapid fashion at specific points in the environment.

Figure 4:
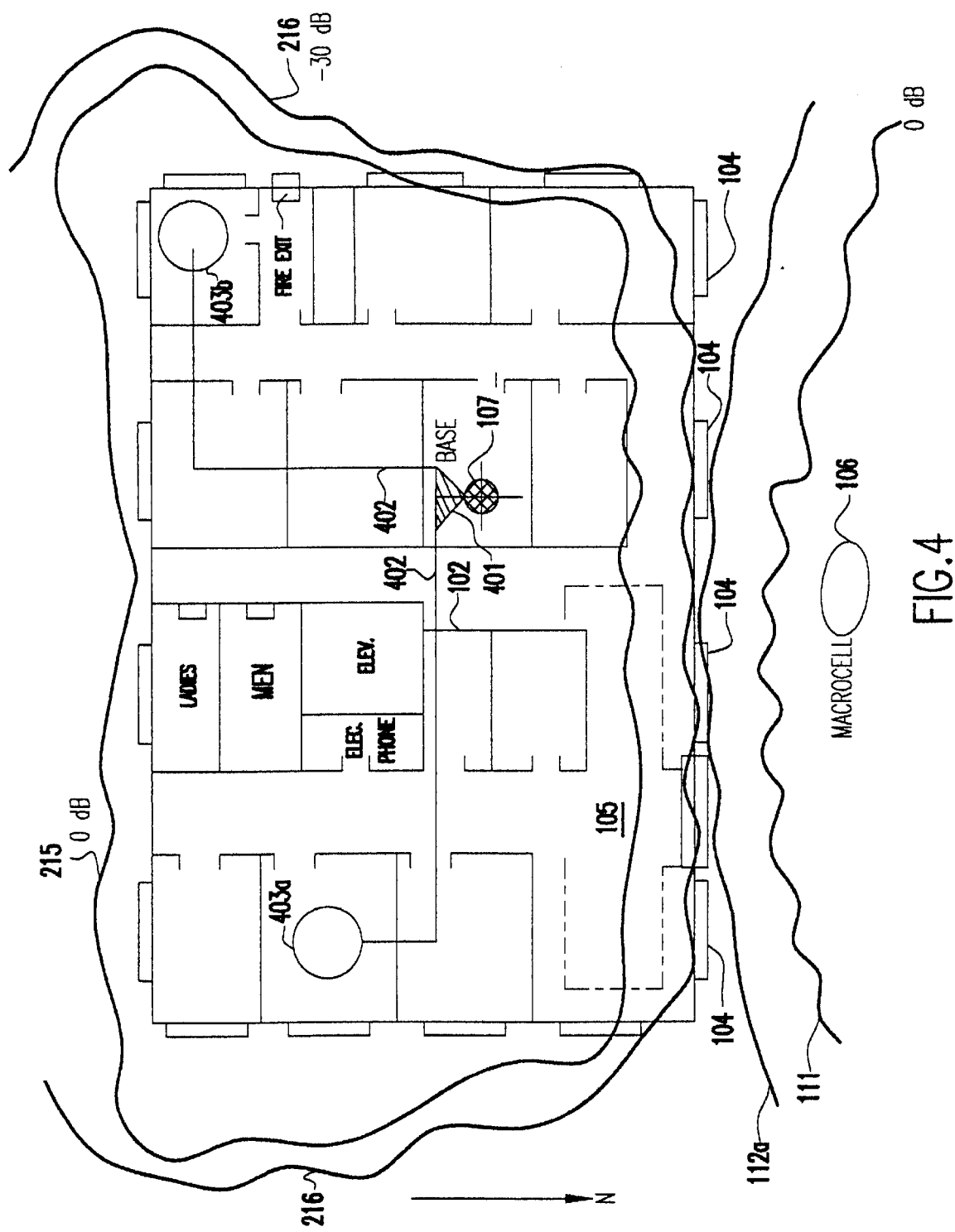
FIG. 4 shows the layout of FIG. 3, but with a revised base station designed to eliminate interference.

For example, FIG. 4 illustrates how the same indoor wireless system of FIG. 3 can provide adequate C/I protection when connected to a distributed indoor antenna system consisting of a two-way splitter 401 (3 dB loss+insertion loss) and two 40 foot cable runs 402 to popular commercial indoor omnidirectional antennas 403. A look at the new 0 dB contour lines 111 and 215, and −30 dB contour lines 112a and 216 show that the coverage inside the building is now adequate; the outdoor system 106 no longer causes significant interference in most parts of the building. Watch points allow a user to instantly determine spot coverage or other system performance without having to wait for the computation and display of contour plots.

The method allows any type of distributed antenna system to be modeled within seconds, while continuously monitoring and analyzing the component and installation cost and resulting link budget, as disclosed in the concurrently filed, copending application Ser. No. 09/318,842, enabling "what-if" designs to be carried out on the fly with minimum guess work and wasted time.

In the present embodiment of the invention, the designer identifies locations in the 3-D environmental database where certain levels of wireless system performance are desirable or critical. These locations, termed "watch points", are points in three-dimensional space which the designer identifies by visually pointing and/or clicking with a mouse or other input device at the desired location in the 3-D environmental database. Any number of such watch points may be placed throughout the 3-D environment at any location. Watch points may be designated prior to performing a performance prediction on a given wireless communication system, or may be dynamically created by the user at any time during the course of a wireless system performance calculation using the same point and click technique described above.

Watch points provide graphical and/or textual feedback to a designer regarding the wireless system performance throughout the environment. Depending on the type of visual feedback desired by the designer, watch points may take the form of one or more of the following:

A computed number displayed as text that represents received signal strength (RSSI), signal-to-interference ratio (SIR), signal-to-noise ratio (SNR), frame error rate (FER), bit error rate (BER), or other wireless system performance metrics;

A small region of solid color whose shade and/or tint varies relative to some computed wireless system performance metric;

Colored lines linking the watch point location with the location one or more antennas in the wireless communication system, where the color, thickness, and/or other physical aspect of the connecting line varies relative to some computed wireless system performance metric and dependent upon whether the forward or reverse wireless system channel is being analyzed;

Other form designated by the designer; or

Any combination of the above.

In all cases, the graphical and/or textual representation of each watch point is updated in real-time as a result of the instantaneous computation of the wireless system performance metrics, which are linked to the 3-D environmental database, and initiated due to dynamic changes being made to the wireless system configuration and/or watch point position itself by the user. For example, if the user repositions an antenna using the mouse or other input device, the effect of doing so on the overall wireless system performance is computed and the results are displayed via changes in the appearance of watch points. In addition, numerical values predicted at the watch points are displayed in summary in a dialog window and written to a text file for later analysis. This process is described in greater detail in the following sections.

The preferred embodiment of the invention utilizes a 3-D environmental database containing information relevant to the prediction of wireless communication system performance. This information includes but is not limited to the location, and the physical and electromagnetic properties of obstructions within the 3-D environment, where an obstruction could be any physical object or landscape feature within the environment (e.g., walls, doors, windows, buildings, trees, terrain features, etc.), as well as the position and physical and electrical properties of communications hardware to be used or simulated in the environment.

The designer identifies and specifies the location and type of all wireless communication system equipment within the 3-D environmental database. This point-and-click process involves the designer selecting the desired component from a computer parts database and then visually positioning, orienting, and interconnecting various hardware components within the 3-D environmental database to form complete wireless communication systems. The preferred embodiment of the computer parts database is more fully described in concurrently filed, copending application Ser. No. 09/318,842. The resulting interconnected network of RF hardware components (commonly known as a wireless distribution or antenna system) is preferably assembled using either a drag and drop or a pick and place technique and is graphically displayed overlaid upon the 3-D environmental database, and utilizes electromechanical information available for each component via the parts list library in order to fully describe the physical operating characteristics of the wireless communication system (e.g., the system noise figure, antenna radiation characteristics, frequencies, etc.). This information is directly utilized during the prediction of wireless system performance metrics and is discussed later.

The present invention represents a dramatic improvement over prior art by providing the design engineer with instant feedback on wireless system performance metrics as the user alters the physical location transmitter, receivers, and other components, or otherwise modifies the antenna system. The current embodiment utilizes the concept of watch points to implement this. Multiple methods of display and a wide range of settings are available for the designer to use in optimizing antenna placement based upon wireless system performance values displayed at each watch point. One skilled in the art could see how watch points as they are herein described could apply to different implementations as well. Descriptions of the different techniques implemented in the current invention are provided in the following sections.

One form of the method allows the designer to dynamically alter the position, orientation, and/or type of any hardware component utilized within a wireless communication system modeled in a 3-D environmental database. Using this technique, the designer may identify watch points representing critical areas of the 3-D environment that require a certain level of wireless system performance. Such areas could include the office of the Chief Executive Officer (CEO) of a company, a conference room, a city park, or the office of a surgeon on call. Next the designer selects the component of interest within the wireless system. In the present invention, this would be the selection of an antenna or leaky feeder antenna, for example, but one skilled in the art could see that this could be any physical antenna system component. Once the desired hardware component is selected, the designer may begin making changes to the state of the component. For example, by moving the mouse or other input device cursor, the user could effectively relocate the selected component to another position in the 3-D environmental database. This involves the user visually moving the mouse cursor, in real-time, such that the cursor resides in another portions of the 3-D database. The present invention recalculates wireless system performance based upon RSSI, SIR, SNR, FER, BER, or other metric, incorporating the user's desired change in the position of the selected component.

The calculations combine the electromechanical properties of each component in the wireless communication system (e.g., noise figure, attenuation loss or amplification, antenna radiation pattern, etc.), the electromagnetic properties of the 3-D environmental database, and radio wave propagation techniques (detailed later) to provide an estimate of the wireless system performance. Calculations are performed at each watch point the user has identified, and the graphical display of the watch point is updated to reflect the result of the calculations.

As the user moves the mouse cursor and effectively repositions the selected component, the overall performance of the wireless communication system may be altered. For example, if the selected component is an antenna, repositioning the antenna changes the origination point of radio wave signals being broadcast from the antenna, and can thus dramatically change the reception of adequate RF signal throughout the environment. Because the graphical display of the watch points is updated in real-time as the selected component is repositioned, the designer is provided instant feedback on the revised wireless system performance, and can make design decisions based upon the viability of multiple proposed locations and/or wireless system configurations rapidly.

In addition to the functionality described above, the designer is free to add additional watch points in any location within the 3-D environmental database at any time during a wireless system performance prediction. In the current implementation, the designer clicks with the mouse or other input device on the desired location in the 3-D environmental database to create a new watch point at the selected location that is then updated throughout the remainder of the performance prediction.

In a similar fashion, the preferred embodiment enables a designer to reorient a selected antenna in real-time with respect to any coordinate axis while the graphical display of all drawing watch points is updated to reflect the revised wireless system performance metrics as a result of the new antenna orientation.

In a similar fashion, a designer may replace an existing hardware component in the wireless communication system with any component available from the parts list library. In doing so, the changes to the wireless communication system performance as a result of the replacement is reflected in the graphical display of the watch points.

In a similar fashion, a designer may selectively include or exclude any subset of components within the wireless communication system while selecting components to involve in the wireless system performance calculation. For example, a designer could consider the effect of repositioning a single antenna, or could consider the combined, composite effect on the watch points as individual antennas are repositioned within a wireless system network consisting of additional, fixed antenna placements.

In a similar fashion, the designer may choose to allow watch points to be mobile. That is, instead of positioning a watch point and having the graphical display of the watch point reflect the changing wireless system performance metric, the designer could instead identify a watch point whose position is mobile but whose graphical display remains constant. In this scenario, the position of the watch point fluctuates along a linear path traced between itself and the current location of the mouse cursor until a position within the 3-D database is found at which the desired level of wireless system performance metric is maintained. For example, the designer may create a watch point to maintain a constant graphical display synonymous with −65 dBm RSSI. As the user repositions, reorients, or otherwise alters components within the wireless communication system, the watch point alters its position within the 3-D environmental database until a position is found at which a calculated value of −65 dBm RSSI is determined.

In addition to enabling a designer to reposition, reorient, and/or replace wireless system components in real-time while visualizing the impact of such changes at selected watch points within the 3-D database, the user may choose to maintain the current configuration of the wireless communication system and instead create a single, mobile watch point. The watch point thus created is dynamically repositioned within the 3-D environmental database in real-time by the user by simply repositioning the mouse cursor. Positioning the mouse cursor at a given location within the 3-D environmental database is equivalent to repositioning the watch point to match that location. In the present invention, this technique is used to allow the mobile watch point to represent a mobile user in the 3-D environmental database. As in the previous scenarios, the graphical display of the watch point is updated in real-time to reflect predicted wireless system performance metrics at the watch point position. The designer is free to select individual subsets of wireless system components to involve in the calculations of wireless system performance. Thus the graphical display of the watch point may reflect the performance metrics specific to individual wireless system components or the composite performance metrics due to the combined effect of multiple selected components. For example, the radiating power of multiple antennas can be combined into a single measure of received signal strength.

The two primary uses of the single mobile watch point technique involve the analysis of the forward link (or down link) and reverse link (or up link) of the wireless system. The forward link of a wireless communication system involves the flow of radio signals from the fixed wireless system to the mobile user, while the reverse link of a wireless communication system involves the flow of radio signals from the mobile user to the fixed wireless system. In the present embodiment, line segments are drawn between the mobile watch point (which is also the mouse cursor) to each antenna the designer has included in the wireless system performance prediction. In addition, the individual or subsets of antennas identified as having the best wireless system performance characteristics are differentiated from the other antennas by altering the color and/or other physical appearance of the connector lines between the antennas and the watch point. As the designer then repositions the mouse cursor, the selected location for the watch point in the 3-D database, and therefore the effective location of the mobile user, is adjusted to match that of the mouse cursor. The wireless system performance metrics are recalculated at the watch point location for the antenna components selected by the designer, and the graphical display of the watch point and all connector lines is updated accordingly.

Another improvement over the prior art is the ability to dynamically model the repositioning of leaky feeder antennas and visualize the effects on wireless system performance. A leaky feeder antenna can be thought of as a cable with many holes regularly spaced along its length. Such a cable would experience a signal loss or emanation at every hole and would thus radiate RF energy along the entire cable length. Leaky feeder antenna, or lossy coaxial cable as it is sometimes referred, can be thought of as analogous to a soaker hose where water flows in at the head of the hose and leaks out through a series of holes. The present method allows the designer to dynamically re-position a portion of the leaky feeder antenna and see in real time the effects on wireless system performance at the specified watch points. In the preferred embodiment, distributed antenna systems can be analyzed in terms of the contributions of individual antennas or collections of antennas taken as a whole, providing "composite" results in the latter case.

Figure 5:
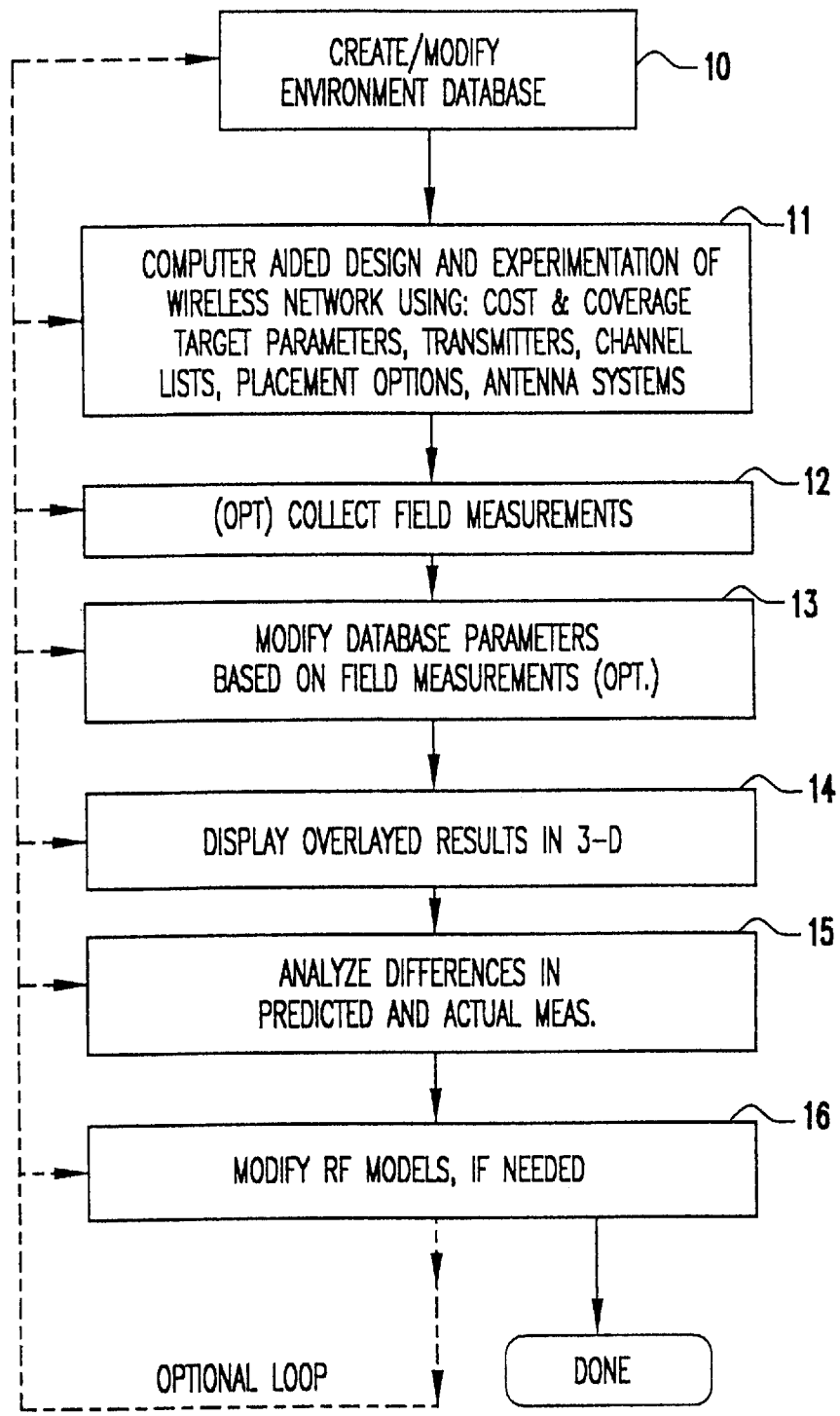
FIG. 5 is a flow diagram of the general method of the present invention.

Referring to FIG. 5, there is shown the general method of the invention. Before one can run an automated predictive model on a desired environment, a 3-D electronic representation of that environment must be created in function block 10. The preferred method for generating a 3-D building or environment database is disclosed in the concurrently filed, copending application Ser. No. 09/318,841. The resulting definition utilizes a specially formatted vector database format and comprises lines and polygons rather than individual pixels (as in a raster format). The arrangement of lines and polygons in the database corresponds to obstructions/partitions in the environment. For example, a line in a database could represent a wall, a door, tree, a building wall, or some other obstruction/partition in the modeled environment.

From the standpoint of radio wave propagation, each of the obstruction/partition in an environment has several electromagnetic properties. When a radio wave signal intersects a physical surface, several things occur. A certain percentage of the radio wave reflects off of the surface and continues along an altered trajectory. A certain percentage of the radio wave penetrates through or is absorbed by the surface and continues along its course. A certain percentage of the radio wave is scattered upon striking the surface. The electromagnetic properties given to the obstruction/partitions define this interaction. Each obstruction/partitions has parameters that include an attenuation factor, surface roughness, and reflectivity. The attenuation factor determines the amount of power a radio signal loses upon striking a given obstruction. The reflectivity determines the amount of the radio signal that is reflected from the obstruction. The surface roughness provides information used to determine how much of the radio signal is scattered and/or dissipated upon striking an obstruction of the given type.

Once this 3-D database of obstruction data has been built, the design engineer performs computer aided design and experimentation of a wireless network to be deployed in the modeled environment in function block 11, to be described later. Cost and wireless system performance target parameters, transmitters, channel lists, placement options and antenna systems are all taken into account by the present invention.

In order to fine tune the experimental predictions, RF measurements may be optionally taken in function block 12. A preferred method for collecting RF measurements is disclosed in copending application Ser. No. 09/221,985, supra. If necessary, database parameters that define the partition/obstruction characteristics may be modified using RF measurements as a guide to more accurately represent the modeled 3-D environment in function block 13.

The results of the predictive models may be displayed in 3-D overlaid with the RF measurement data, if any, at any time in function block 14. The design engineer analyzes the differences in the predicted and actual measurements in function block 15, and then modifies the RF predictive models, if needed, in function block 16. If necessary, the 3-D environment database may be modified based on the actual measurements to more accurately represent the wireless system coverage areas in function block 10, and so on iteratively until done. The designer can optionally continue with any other step in this process, as desired.

Figure 6:
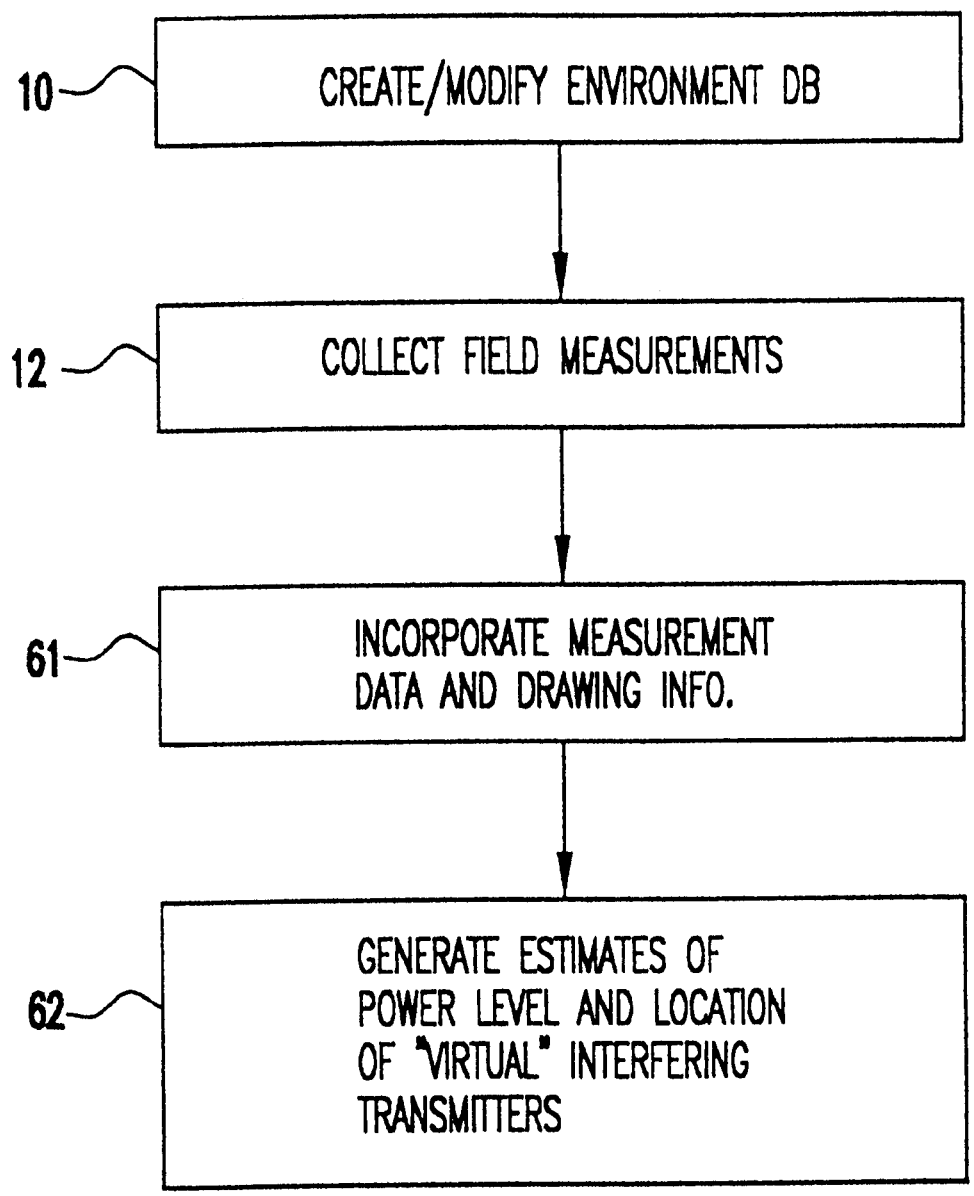
FIG. 6 is a flow diagram of a method of the invention used to generate estimates based on field measurements.

The method of invention may be used in a variety of ways depending on the goals of the design engineer. FIG. 6 shows a variant on the above method used to generate estimates based on RF measurements. A 3-D database of the environment must still be generated in function block 10. Field measurements are collected in function block 12. The RF measurement data are then incorporated into the drawing of the environment in function block 61. The design engineer may then generate estimates of power level and location of potential transmitters in function block 62.

Figure 7:
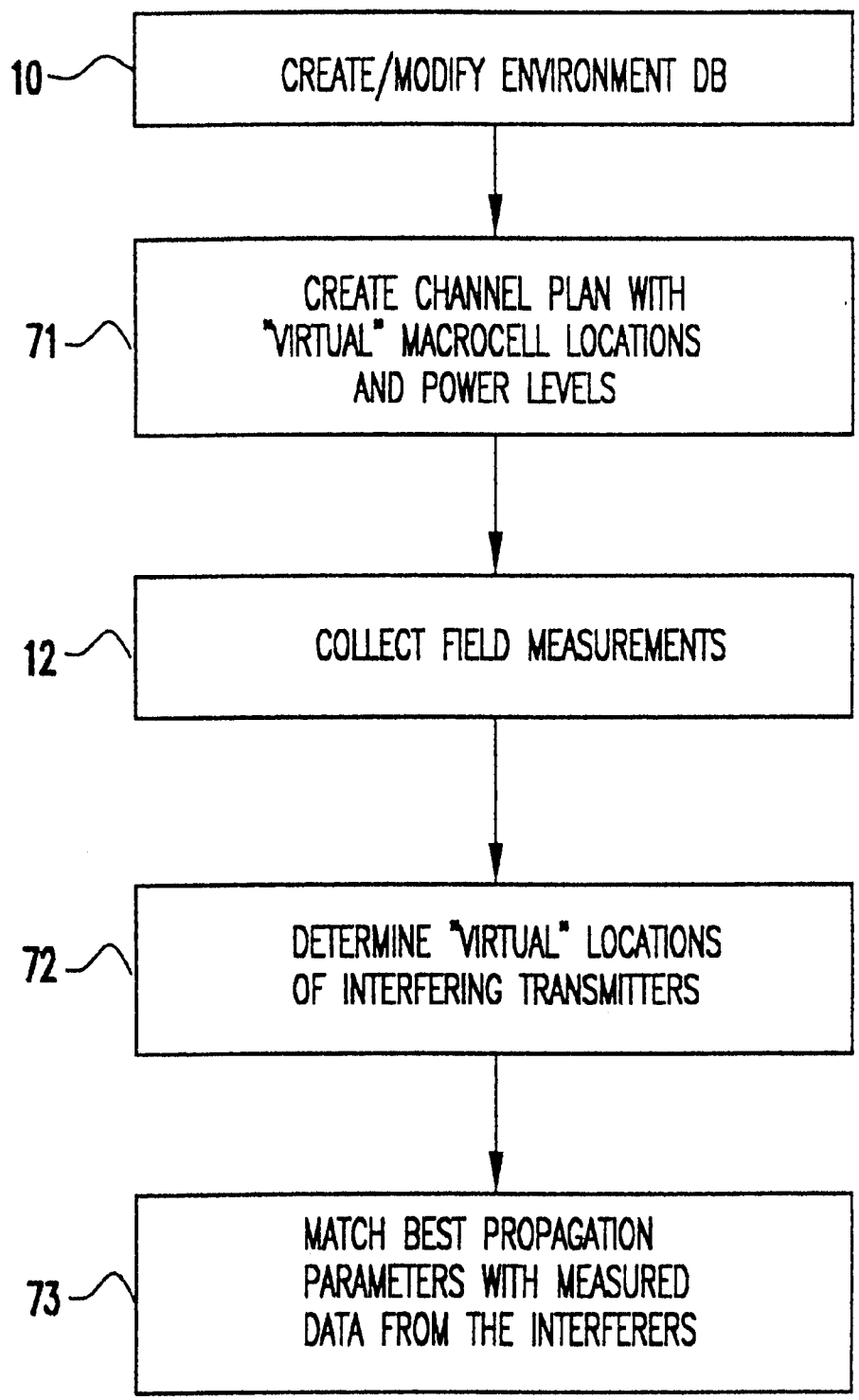
FIG. 7 is a flow diagram of a method of the invention used to match best propagation parameters with measured data.

FIG. 7 shows a variant of the method used to achieve optimal prediction accuracy using RF measured data. Once again, a 3-D database of the environment is generated in function block 10. However, before collecting field measurements, the design engineer creates a channel plan with "virtual" macrocell locations and power levels in function block 71. The field measurements are then collected in function block 12 and the "virtual" locations of interfering transmitters can be determined in function block 72. The best propagation parameters are then matched with measured data from the interferers in function block 73.

Figure 8:
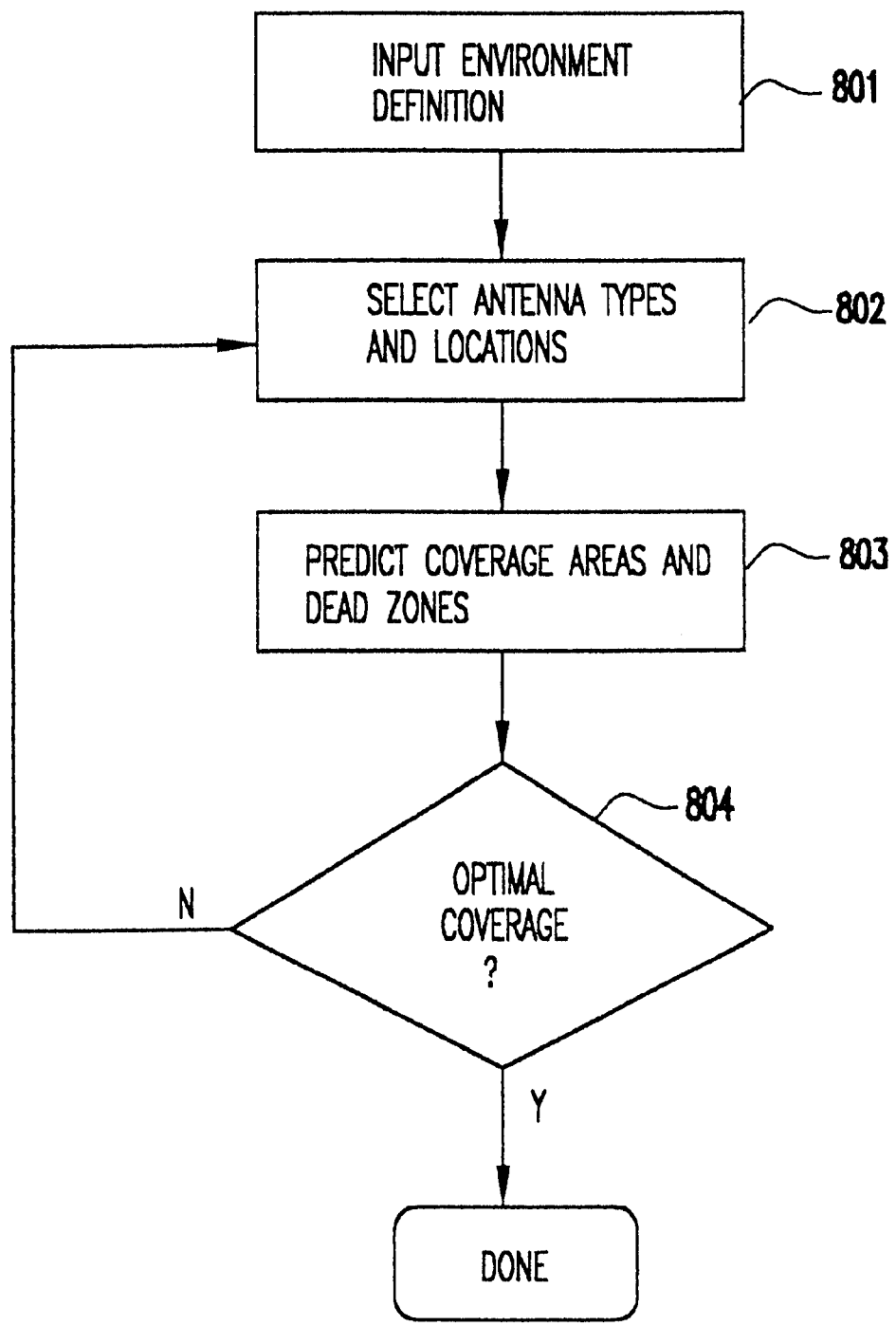
FIG. 8 is a flow diagram of a method for prediction used in the present invention.

A more detailed description of the method for prediction used in the present invention is now described. Referring to FIG. 8, the 3-D environment definition is input in function block 801. The first step required before predicting the performance of the wireless communication system is to model the wireless system with the 3-D environment. Antennas and types of related components and locations are selected in function block 802. The desired antennas are chosen from a parts list of wireless hardware devices that may include a variety of commercially available devices. Each antenna is placed at a desired location within the environment, for instance, in a specific room on a floor of a building or on a flag pole in front of a building. A number of other components may be created and placed either within or connected to each antenna system. These components include, but are not limited to: cables, leaky feeder antennas, splitters, connectors, amplifiers, or any other user defined component.

Figure 9A:
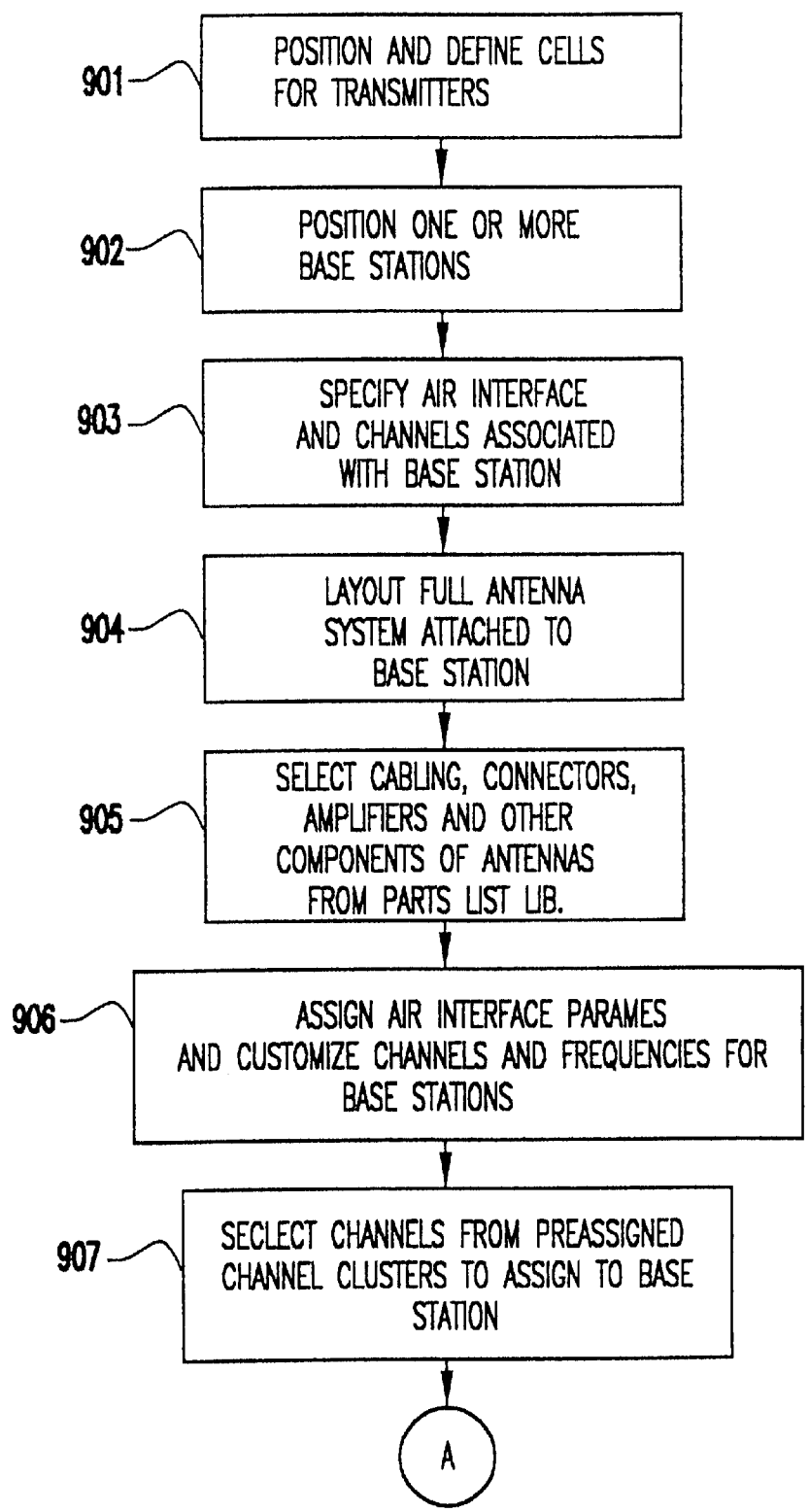
FIGS. 9A and 9B together make up a flow diagram of a method to generate a design of a wireless network and determine its adequacy.
Figure 9B:
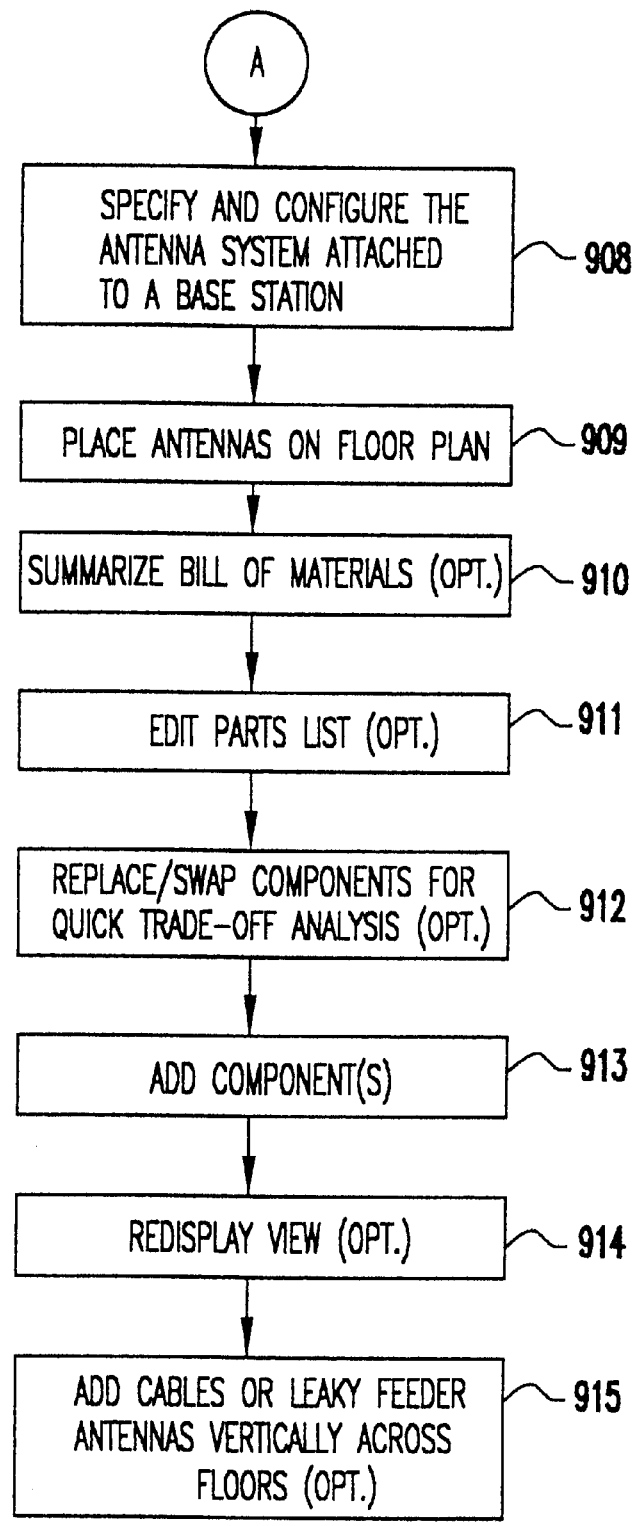

FIGS. 9A and 9B show a method for adding antenna systems to a desired environment and generally for running trade-off analyses. First, the designer positions and defines outdoor wireless communication systems, if necessary in function block 901. Next, the designer positions and defines indoor base stations in function block 902. The methods of function blocks 901 and 902 differ in that the components of indoor wireless system will typically be different than an outdoor wireless system. In both cases, the designer is guided through a series of pull down menus and point-and-click options to define the location, type of hardware components and associated performance characteristics of the antenna systems. This data is stored in a database, that also contains cost and manufacturing specific information to produce a complete Bill of Materials list automatically, to be viewed at any time.

In order to fully describe an antenna system in a newly created (or to be modified) wireless system, the designer specifies the air interface/technology and frequencies associated with the wireless system in function block 903. The designer then lays out the full antenna system for the wireless network in function block 904. Components such as base stations, cabling, connectors, amplifiers and other items of the antenna system are then selected from a parts list library containing information on commercially available hardware components in function block 905. Next, the air interface and technology specific parameters are assigned and channel frequencies are customized for the wireless system in function block 906. The channel frequencies are selected from pre-assigned channel clusters and assigned to the wireless system in function block 907. An antenna system is then configured in function block 908, selecting antennas from the parts list library as described above. The antennas are placed on the floor plan in function block 909 using a point and click of a mouse or other positioning device to visually place each component in the 3-D database.

At this or any time after a component has been placed on a floor, the designer may view a bill of materials in function block 910. If necessary, the parts list may be modified to add or delete components or modify a component's cost or performance characteristics in function block 911. Components may be replaced or swapped for similar components for a quick trade-off analysis of both wireless system performance and overall cost in function block 912. Components may be added, deleted or modified to more fully define the wireless communications system in function block 913. The designer may redisplay the view of the environment including the wireless communication system, RF measurement data, and/or wireless system predicted performance results in a variety of forms, including 2-D, 3-D wireframe, 3-D wireframe with hidden lines, 3-D shaded, 3-D rendered or 3-D photorealistic rendering, at any time in function block 914.

Typically, a designer will add wireless system components in succession, where each newly placed system component connects to a previously positioned component in the wireless network. One should note that cables and leaky feeder antennas are defined by a series of vertices connected by lines representing lengths of cabling as they are placed on a floor. Cables and leaky feeders may also stretch vertically across building floors, down the sides of buildings, through elevator shafts, etc., simply by adding a vertex in the cable, changing the vertical height, and then continuing to place cable in new locations, in function block 915. The designer does not need to manipulate a 3-D view of the environment and attempt to guide the cables vertically in the 3-D model. The designer may repeat any of the steps in this process, in any order, in the present invention.

Referring again to FIG. 8, once the 3-D environment has been defined and antennas, cables and other objects have been selected and located, the wireless system performance prediction models may be run in function block 803. A variety of different such models are available and may be used in succession, or alone to generate a sufficient number of "what-if" scenarios for predicting and optimizing of antenna placements and component selections.

Figure 10:
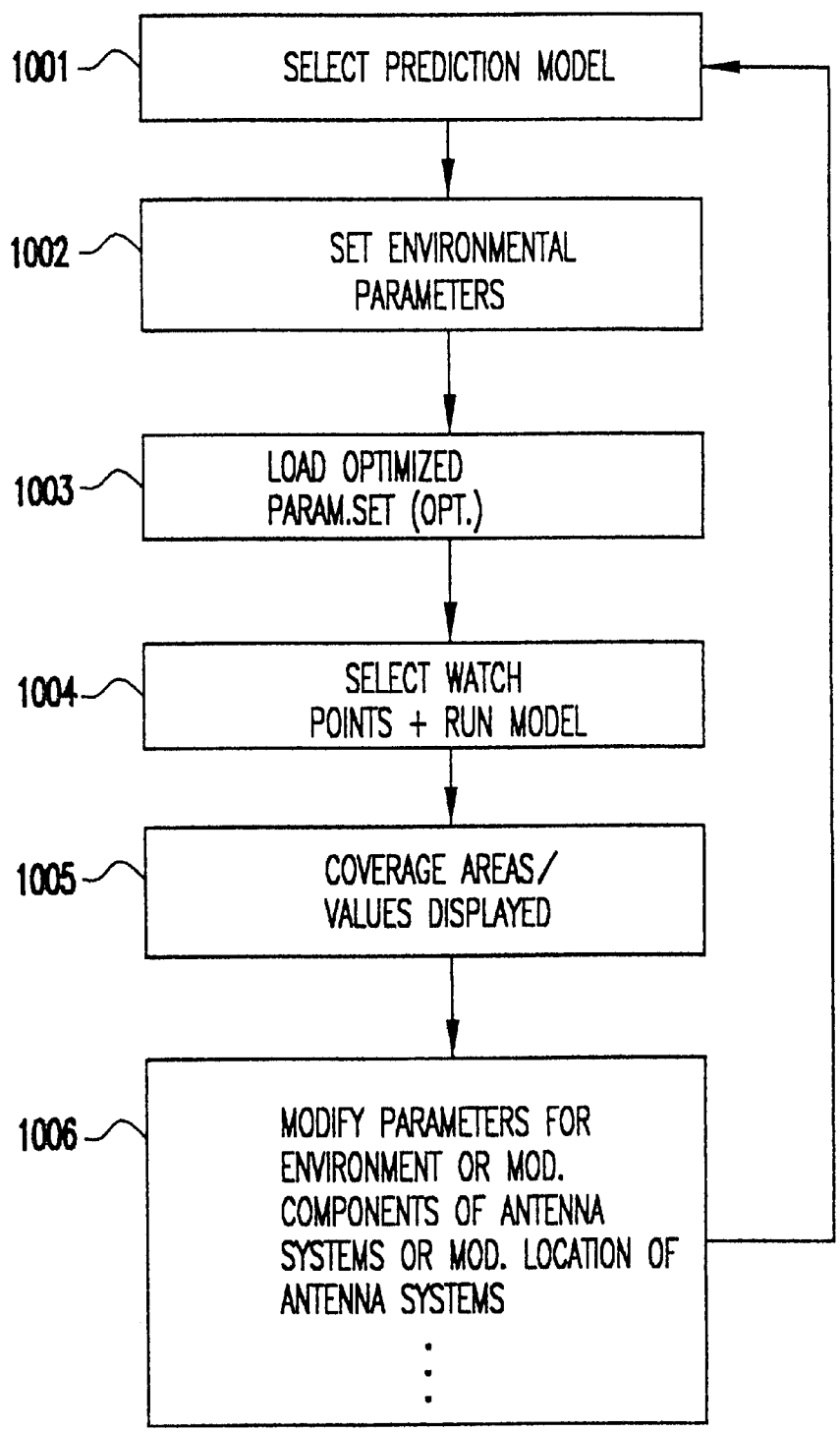
FIG. 10 is a flow diagram showing a method for using watch points during antenna repositioning or modification.

Referring to FIG. 10, a method for predictive modeling according the invention is shown. First, the designer selects the desired wireless system performance prediction model in function block 1001. Preferred models are:

Wall/floor Attenuation Factor, Multiple Path Loss Exponent Model,

Wall/floor Attenuation Factor, Single Path Loss Exponent Model,

True Point-to-Point Multiple Path Loss Exponent Model,

True Point-to-Point Single Path Loss Exponent Model,

Distance Dependent Multiple Breakpoint Model,

Distance Dependent Multiple Path Loss Exponent Model,

Distance Dependent Single Path Loss Exponent Model, or other models, such as ray tracing and statistical models, as desired by the design engineer.

The physical and electrical properties of obstructions in the 3-D environment are set in function block 1002. Although not all parameters are used for every possible predictive model, one skilled in the art would understand which parameters are necessary for a selected model. Parameters that may be entered include:

Prediction configuration—RSSI, C/I, and/or C/N (carrier to noise ratio);

Mobile Receiver (RX) Parameters—power, antenna gain, body loss, portable RX noise figure, portable RX height above floor;

Propagation parameters—
    Partition Attenuation Factors
    Floor Attenuation Factors Path Loss Exponents
Multiple Breakpoints
Reflectivity
Surface Roughness
Antenna Polarization
other parameters as necessary for a given model The designer may save sets of physical, electrical and aesthetic parameters for later re-use. If such a parameter set has been previously saved, the designer may load that set in function block 1003, thereby overwriting any parameters already in selected.

Figure 11:
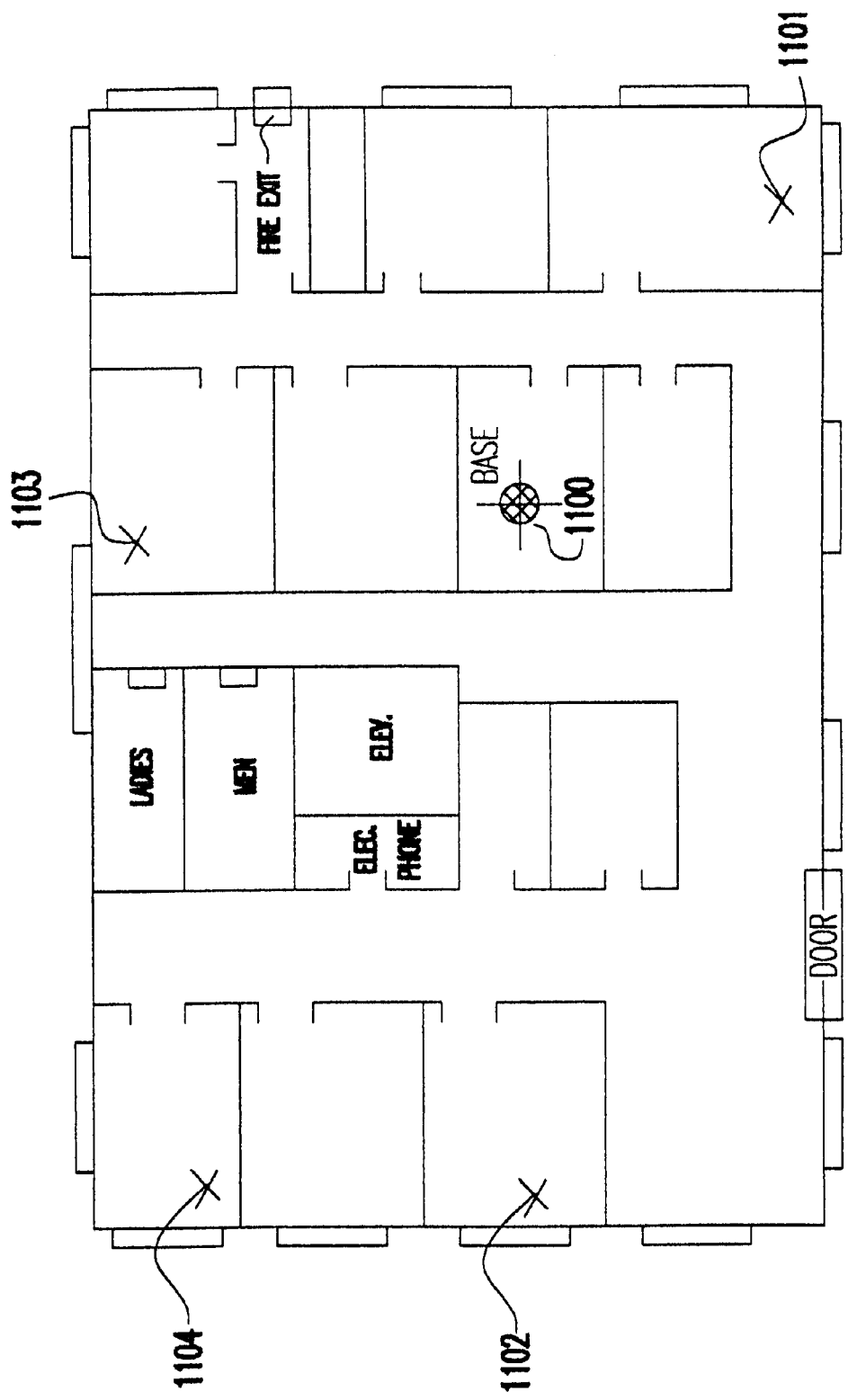
FIG. 11 shows a simplified layout of a floor plan of a building with a base station and watch points selected.

A designer then may select a number of watch points in function block 1004 to monitor for wireless system performance. Referring now to FIG. 11, there is shown a simplified layout of a floor plan with a base station 1100. The designer may use a mouse or other positioning device to point and click to any number of locations in the floor plan to select critical areas, or watch points, for monitoring. Here, for instance, four watch points 1101, 1102, 1103 and 1104 have been selected.

Figure 12:
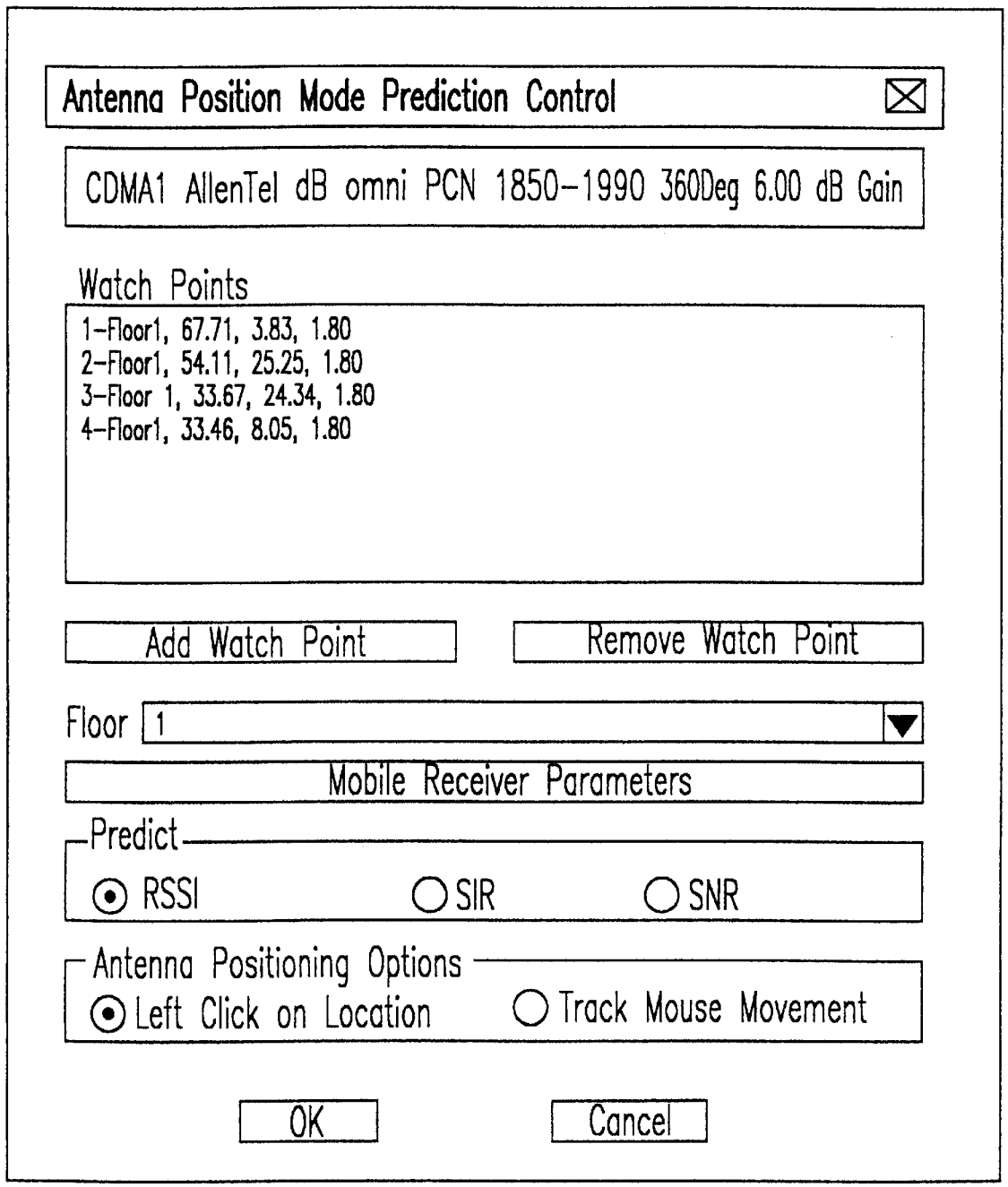
FIG. 12 shows a dialog box displaying the locations of the selected watch points and choices for display information.

FIG. 12 shows a display, that lists by location, watch points selected for the current prediction. The designer may then select predictions for RSSI, signal to interference ratio (SIR) or signal to noise ratio (SNR). In addition, the designer can see changes in predicted values for each watch point in real time as the mouse is moved, or can choose to select new antenna positions specifically by clicking on a new location. As the designer repositions the mouse cursor, the antenna(s) selected prior to initiating the prediction are effectually repositioned and/or relocated according to position of the cursor. Once all watch points are selected, the prediction model is run. An alternative embodiment is that watch points could be entered and modified on the fly, as the prediction model is being run, rather than defined only prior to running the model. Another alternative embodiment is that RF values at the watch points are updated continuously as the mouse is repositioned, without a click being necessary.

Figure 13:
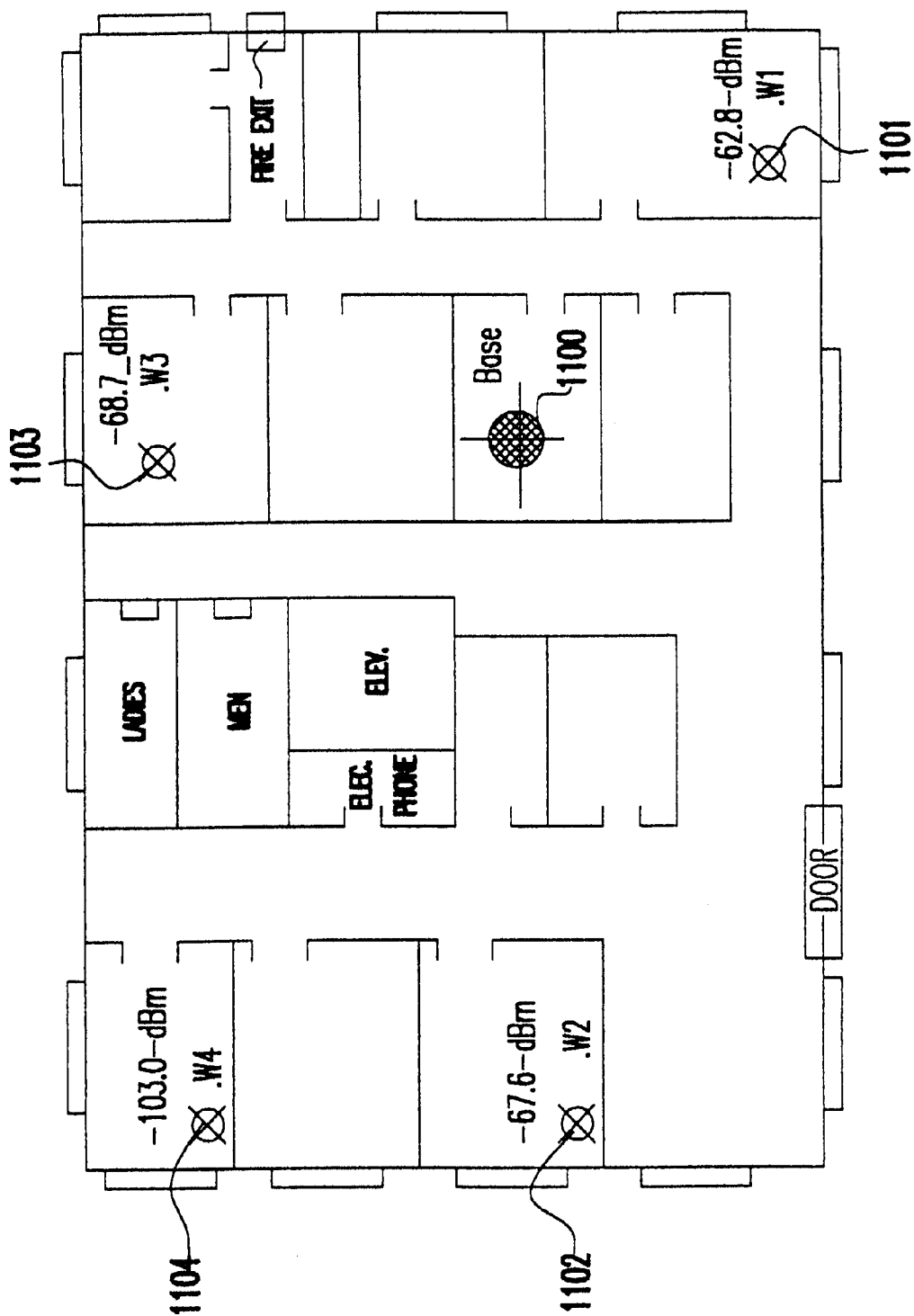
FIG. 13 shows a simplified layout of a floor plan of a building with a base station and initial RSSI values for the selected watch points.
Figure 14:
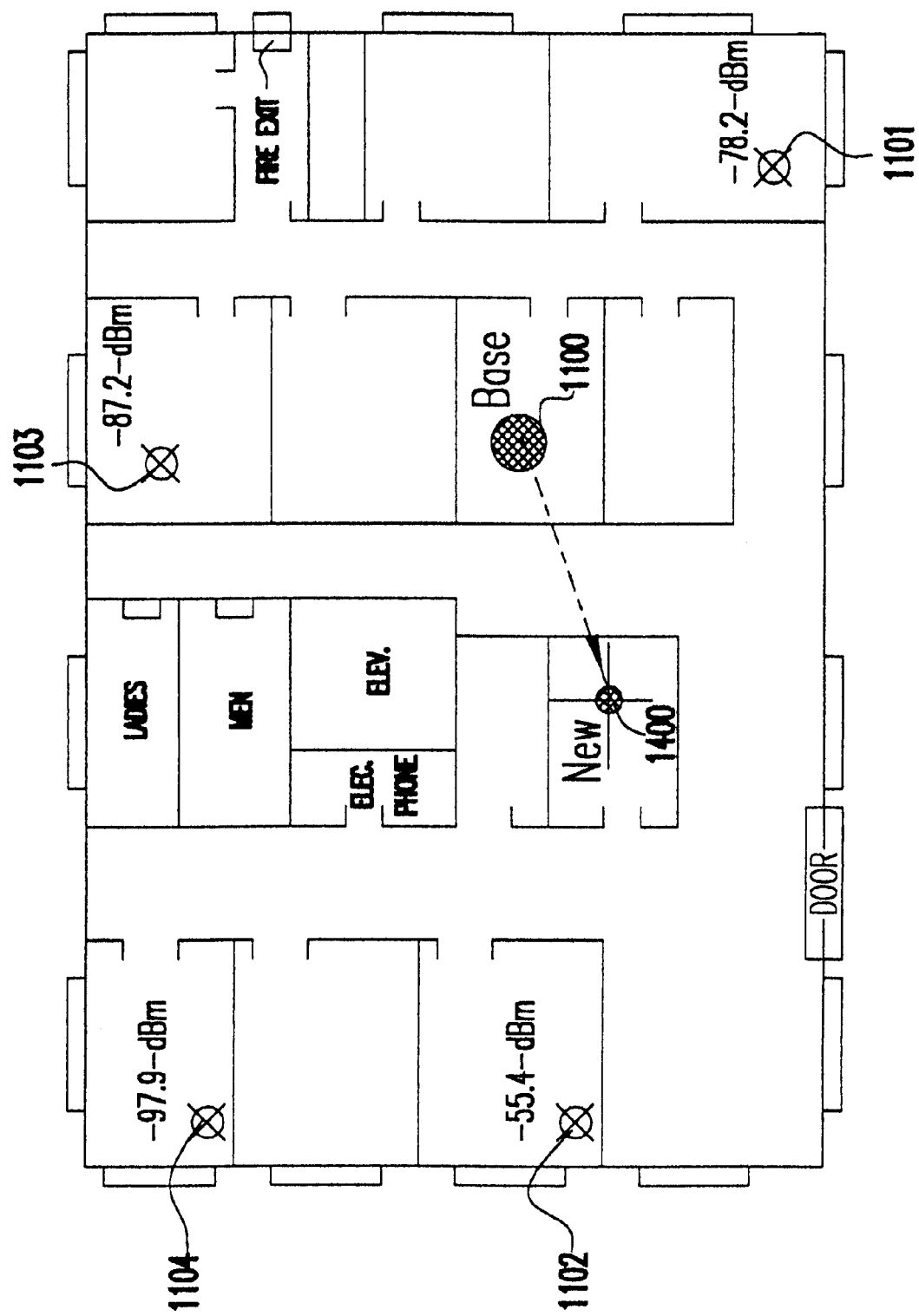
FIG. 14 shows a simplified layout of a floor plan of a building with a repositioned base station and changed RSSI values for the selected watch points.
Figure 15:
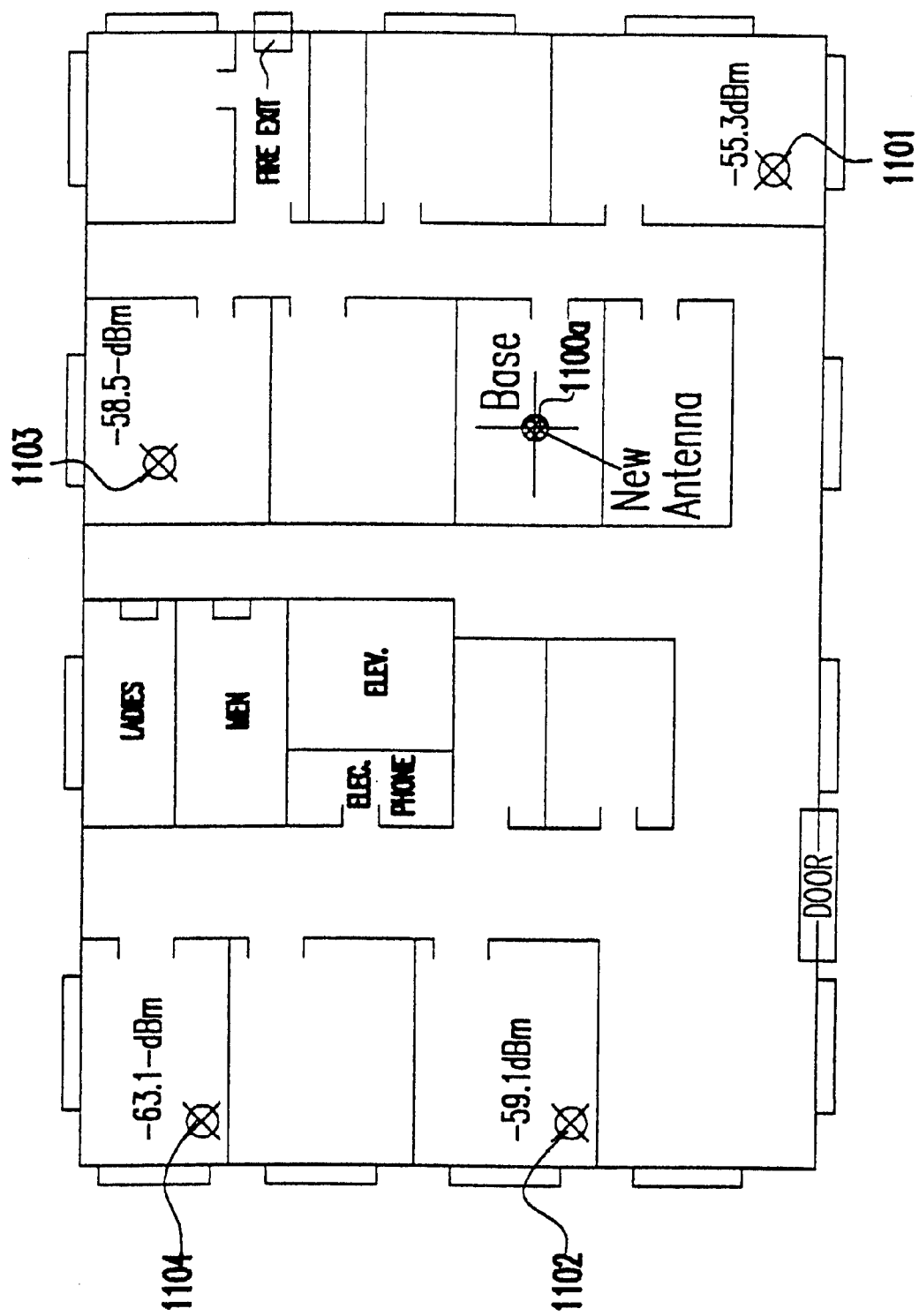
FIG. 15 shows a simplified layout of a floor plan of a building with a re-engineered base station and changed RSSI values for the selected watch points.

FIG. 13 shows the floor plan of FIG. 11 with the initial RSSI values for each watch point 1101, 1102, 1103 and 1104 also shown. The designer may move the antenna 1100 to a new location and monitor the same watch points for coverage. FIG. 14 shows the floor plan of FIGS. 11 and 13 with the antenna 1100 moved to a new location 1400. The RSSI values at each watch point 1101, 1102, 1103, and 1104 are automatically updated with values associated with the new location of the antenna. Alternatively, the designer may choose to modify the components within the antenna system 1100 for performance or cost reasons. FIG. 15 shows the floor plan of FIGS. 11 and 13 with a base station 1100a at the same location, but with a higher performance antenna component. The RSSI values at each watch point 1101, 1102, 1103, and 1104 are again automatically updated with values associated with the new wireless system performance parameters.

Referring again to FIG. 10, for RF coverage models, the coverage areas and values are displayed in function block 1005. If so desired, the designer modifies the electrical parameters of the obstructions, or modified components of antenna systems, or modifies antenna system locations or orientation, etc. in function block 1006 before running another prediction model in function block 1001.

Referring again to FIG. 8, after running a number of models, the design engineer may determine that RF coverage is optimal in decision block 804. If so, then depending on the results either a change in the location of antenna(s) and components will be desired or possibly just a substitution of components without a location change. For instance, even though the coverage may be more than adequate, the total cost of the wireless system could be prohibitive. A method for optimizing the costs using a dynamic, real time, bill of materials management system is disclosed in the concurrently filed, copending application Ser. No. 09/318, 842. Regardless, if the wireless network as currently modeled is not deemed optimal, then the method would continue again in function block 802 to re-select the components.

Once the design is as desired, then the 3-D database holds all of information necessary to procure the necessary components in the Bill of Materials. The locations of each component are clearly displayed, and a visual 3-D representation can be viewed as a guide.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for optimizing the design of a communications network, comprising the steps of:

accepting input parameters defining a physical environment modeled by a floor plan of a building in which a communications network is implemented or to be implemented;

selecting data representing a finite number of components to be used in said communications network and associated locations for said finite number of components within said physical environment;

displaying the locations of said components within said physical environment on a display;

selecting at least one point of specific interest in said physical environment; and predicting and displaying system performance information for said at least one point of specific interest in said physical environment.

2. A method for optimizing the design of a communications network as recited in claim 1 further comprising the steps of moving at least one said component within said physical environment and updating said system performance information displayed for said at least one point of specific interest.

3. A method for optimizing the design of a communications network as recited in claim 1 further comprising the steps of replacing at least one said component within said physical environment with a substitute component having different performance characteristics, and updating said system performance informaton displayed for said at least one point of specific interest.

4. A method for optimizing the design of a communications network as recited in claim 1 further comprising the steps of re-orienting at least one said component within said physical environment, and updating said system performance information displayed for said at least one point of specific interest.

5. A method for optimizing the design of a communications network as recited in claim 1 further comprising the steps of moving said at least one point of specific interest to a second location in said physical environment and displaying said system performance information for said second location.

6. A method for optimizing the design of a communications network as recited in claim 1 further comprising the step of obtaining data for a select group of components from a stored data set for a plurality of components, and wherein said selecting step selects said finite number of components from said select group.

7. A method for optimizing the design of a communications network as recited in claim 1 wherein said components are wireless communications components.

8. A method for optimizing the design of a communications network, comprising the steps of:

accepting input parameters defining a physical environment in which a communications network is implemented or to be implemented;

selecting data representing a finite number of components to be used in said communications network and associated locations for said finite number of components within said physical environment;

displaying the locations of said components within said physical environment on a display;

selecting at least one point of specific interest in said physical environment; and predicting and displaying system performance information for said at least one point of specific interest in said physical environment, wherein said system performance values are displayed at said at least one point of specific interest on said display.

9. A method for optimizing the design of a communications network, comprising the steps of:

accepting input parameters defining a physical environment in which a communications network is implemented or to be implemented;

selecting data representing a finite number of components to be used in said communications network and associated locations for said finite number of components within said physical environment;

displaying the locations of said components within said physical environment on a display;

selecting at least one point of specific interest in said physical environment, predicting and displaying system performance information for said at least one point of specific interest in said physical environment; and displaying interconnections between said components within said physical environment.

* * * * *

UNITED STATES PATENT AND TRADEMARK OFFICE
CERTIFICATE OF CORRECTION

PATENT NO. : 6,317,599 B1  Page 1 of 1
DATED : November 13, 2001
INVENTOR(S) : Rappaport et al.

It is certified that error appears in the above-identified patent and that said Letters Patent is hereby corrected as shown below:

Column 4,
Line 6, "effect" should be -- affect --.

Column 5,
Line 54, between "properties" and "loss", insert -- such as --.
Line 55, "propogation" should be -- propagation --.

Column 6,
Line 34, between "techniques" and "modes", insret -- or --.
Line 63, after "band" and before "in", insert -- users --.

Column 8,
Line 26, after "location" and before "one", insert -- of --.

Column 9,
Line 18, after "location" and before "transmitter", insert -- of --.

Column 12,
Line 10, at the end of the line delete "of".
Line 11, at the beginning of the line, delete "the"

Column 16,
Line 48, "infornation" should be -- information --.

Signed and Sealed this

Sixth Day of August, 2002

Attest:

JAMES E. ROGAN
Attesting Officer   Director of the United States Patent and Trademark Office

UNITED STATES PATENT AND TRADEMARK OFFICE
CERTIFICATE OF CORRECTION

PATENT NO.    : 6,317,599 B1
DATED         : November 13, 2001
INVENTOR(S)   : Rappaport et al.

It is certified that error appears in the above-identified patent and that said Letters Patent is hereby corrected as shown below:

Column 17,
Line 21, the words "values are" should be -- information is --.

Signed and Sealed this

Fifteenth Day of March, 2005

JON W. DUDAS
*Director of the United States Patent and Trademark Office*